(12) United States Patent
Regen et al.

(10) Patent No.: US 10,307,937 B2
(45) Date of Patent: Jun. 4, 2019

(54) HOT STAMPING METHOD

(71) Applicant: Sartorius Stedim Biotech GmbH, Goettingen (DE)

(72) Inventors: Thomas Regen, Goettingen (DE); Sebastian Purmann, Goettingen (DE); Nikoloudis Paschalis, Goettingen (DE); Christian Grimm, Heilbad (DE)

(73) Assignee: Sartorius Stedim Biotech GmbH (DE)

( * ) Notice: Subject to any disclaimer, the term of this patent is extended or adjusted under 35 U.S.C. 154(b) by 526 days.

(21) Appl. No.: 14/649,339

(22) PCT Filed: Dec. 4, 2013

(86) PCT No.: PCT/EP2013/003661
§ 371 (c)(1),
(2) Date: Jun. 3, 2015

(87) PCT Pub. No.: WO2014/086485
PCT Pub. Date: Jun. 12, 2014

(65) Prior Publication Data
US 2015/0306789 A1    Oct. 29, 2015

(30) Foreign Application Priority Data

Dec. 4, 2012  (DE) .................... 20 2012 012 729 U
Sep. 10, 2013 (DE) ......................... 10 2013 015 069

(51) Int. Cl.
*B29C 65/00*      (2006.01)
*B29C 65/02*      (2006.01)
(Continued)

(52) U.S. Cl.
CPC ........ *B29B 13/024* (2013.01); *B29C 45/0055* (2013.01); *B29C 65/02* (2013.01);
(Continued)

(58) Field of Classification Search
CPC ......... B29C 65/02; B29C 65/18; B29C 65/20; B29C 66/1142; B29C 66/5221;
(Continued)

(56) References Cited

U.S. PATENT DOCUMENTS 2,770,012 A * 11/1956 Bowerman ........... B29C 43/027
                                                                    264/269
3,270,117 A *  8/1966 Hobson ................ B29D 23/001
                                                                    264/320
(Continued)

FOREIGN PATENT DOCUMENTS

GB         1249168 A * 10/1971    ......... B29C 65/1432

OTHER PUBLICATIONS

International Appl. No. PCT/EP2013/003661—English Translation of International Preliminary Report on Patentability dated Jun. 18, 2015.
(Continued)

*Primary Examiner* — Philip C Tucker
*Assistant Examiner* — Brian R Slawski
(74) *Attorney, Agent, or Firm* — Gerald E. Hespos; Michael J. Porco; Matthew T. Hespos

(57) ABSTRACT

A method for implementing a channel (56) includes providing a preform (20) having a recess (22) therein and heating a channel implementation element (30') to a temperature greater than a melting temperature of a material of the preform (20). An external contour of the channel implementation element (30') at least regionally corresponds to an internal contour of the channel (56) to be implemented. The method then moves the heated channel implementation and/or the preform (20) in relation to one another so that the heated channel implementation element (56) at least regionally moves into the recess (22) in a moving-in direction. The material of the preform (20) is at least partially melted in a
(Continued)

region around the recess (20) and is at least partially displaced by the channel implementation element (30'), wherein at least a part of the channel (56) to be implemented is thus implemented.

9 Claims, 10 Drawing Sheets

(51) Int. Cl.
| | |
|---|---|
| B32B 37/00 | (2006.01) |
| B32B 38/00 | (2006.01) |
| B32B 38/10 | (2006.01) |
| B29C 51/16 | (2006.01) |
| B32B 38/04 | (2006.01) |
| C08J 5/00 | (2006.01) |
| G01F 1/66 | (2006.01) |
| B28B 5/00 | (2006.01) |
| B29C 47/00 | (2006.01) |
| B29B 13/02 | (2006.01) |
| G01F 15/00 | (2006.01) |
| G01F 15/14 | (2006.01) |
| B29D 23/00 | (2006.01) |
| B29C 45/00 | (2006.01) |
| G01F 15/18 | (2006.01) |
| B29C 65/08 | (2006.01) |
| B29C 65/16 | (2006.01) |
| B29C 65/20 | (2006.01) |
| B29K 101/12 | (2006.01) |
| B29L 9/00 | (2006.01) |
| B29L 23/00 | (2006.01) |

(52) U.S. Cl.
CPC ........... *B29D 23/001* (2013.01); *G01F 1/662* (2013.01); *G01F 15/006* (2013.01); *G01F 15/14* (2013.01); *G01F 15/185* (2013.01); *B29C 65/08* (2013.01); *B29C 65/16* (2013.01); *B29C 65/20* (2013.01); *B29C 66/5221* (2013.01); *B29C 66/52298* (2013.01); *B29C 66/543* (2013.01); *B29K 2101/12* (2013.01); *B29L 2009/00* (2013.01); *B29L 2023/00* (2013.01)

(58) Field of Classification Search
CPC ......... B29C 57/00; B29C 57/02; B29C 43/02; B29C 43/021; B29C 43/027; B29C 43/36; B29C 43/361; B29C 2043/029; B29C 2043/3602; B29C 2043/3615; B29C 2043/3634; G01F 1/66; G01F 1/662; B29B 13/024; B29B 13/025
USPC ..... 156/60, 64, 90, 152, 153, 154, 196, 212, 156/242, 244.11, 244.13, 245, 250, 267, 156/293, 296, 304.1, 304.2, 304.5, 304.6, 156/308.2, 308.4, 309.6, 309.9; 73/861, 73/861.18, 861.27, 861.28, 861.29, 73/861.31; 264/239, 241, 248, 250, 251, 264/294, 299, 319, 320, 323
See application file for complete search history.

(56) References Cited

U.S. PATENT DOCUMENTS

| | | | | |
|---|---|---|---|---|
| 3,929,959 | A * | 12/1975 | Findlay | F42B 5/30 102/466 |
| 4,084,739 | A * | 4/1978 | Koltz | B23K 37/0531 228/168 |
| 4,551,293 | A * | 11/1985 | Diehl, Jr. | B29C 55/24 264/150 |
| 4,957,669 | A * | 9/1990 | Primm | A61F 2/06 264/127 |
| 5,090,608 | A * | 2/1992 | Jones | F16L 13/02 228/212 |
| 5,104,031 | A * | 4/1992 | Wolfe | B21D 41/02 228/154 |
| 6,838,041 | B2 * | 1/2005 | Rowley | B29B 13/024 264/266 |
| 2008/0257604 | A1 * | 10/2008 | Becker | B29B 13/025 175/62 |

OTHER PUBLICATIONS

"How to enlarge the gap in the flw of nipples of a baby bottle" Internet—Bog by Dr. Andreas Busse dated Jan. 24, 2003.
European Search Report dated Aug. 1, 2017.

* cited by examiner

HOT STAMPING METHOD

BACKGROUND

1. Field of the Invention

The present invention relates to a method for implementing a channel and a product comprising at least one channel.

2. Description of the Related Art

Various production methods can be used for creating channels in components. In the case of mechanical machining, cylindrical through boreholes are created by drilling or milling. Milling is suitable in particular for manufacturing internal channels having a variable cross section, for example, for transitions in a cross section from square to round. Undercuts are also implementable in this case. Disadvantages in this case are the relatively complex CNC programming and the achievable surface quality, which is only inadequate, since machining grooves occur during the milling. Further machining steps are thus required after the milling, by which the surfaces can be smoothed. These method steps, for example, honing, grinding, and polishing, are often linked to a high level of effort and costs, however. A further mechanical production method is drilling. Internal channels may only be implemented as cylindrical cross sections, for example, by stepped boreholes, however.

Alternatively, the desired components can be manufactured in the injection molding method. In this case, variable cross sections may be produced by special mold technologies and undercuts may be implemented by the use of spring-loaded ejectors or collapsible cores. Through boreholes having a variable cross section without undercuts can be created by appropriate cores in the tool. Sufficient demolding bevels must be provided by the shrinking behavior of the melt during cooling in the mold. In the event of excessively long cores in the injection molds, core misalignment can occur during the injection operation in the event of unfavorably designed gating. This results in different wall thicknesses in the component. To minimize the core misalignment, mold cores are frequently partitioned in the middle on the ejector side or nozzle side. In this case, however, a mold parting line results at the meeting point of the two core halves. Furthermore, the high costs of the molds are disadvantageous in the injection molding method.

It is therefore the object of the present invention to provide a simple and cost-effective production method for creating channels in components having high surface quality. It is furthermore the object of the present invention to provide a product comprising at least one channel, which can be produced simply and cost-effectively, and which has a high surface quality of the channels.

SUMMARY OF THE INVENTION

According to a first aspect of the invention, a method is provided for implementing a channel, comprising: providing a preform having a recess implemented therein; heating a channel implementation element to a temperature greater than a melting temperature of a material of the preform, wherein an external contour of the channel implementation element at least regionally corresponds to an internal contour of the channel to be implemented; and moving the heated channel implementation element and/or the preform in relation to one another, so that the heated channel implementation element moves at least regionally into the recess in a moving-in direction (wherein the moving-in direction preferably essentially corresponds to an implementation direction of the channel), wherein the material of the preform is at least partially melted in a region around the recess and is at least partially displaced by the channel implementation element, wherein at least a part of the channel to be implemented is thus implemented.

The channel to be implemented is in particular an internal channel having a closed cross section, which is capable of guiding or transporting a fluid. In particular, the channel is fluid-tight. Such channels can be implemented in hose connectors, formfitting connecting elements, formfitting inserts having threads, twist locks, through-flow plastic parts, or further products.

A "preform" is understood in this case as the blank having a still imprecisely pre-molded channel. The method product can in turn represent a blank for subsequent method steps, for example, welding together individual components which were manufactured according to the method.

The preform may be as oblong, and can have an essentially round or an essentially rectangular cross section, for example. The preform may be preferably essentially cylindrical, which makes it easier to clamp the preform in the channel implementation device. The preform is implemented from a meltable material. The meltable material can be any meltable material, for example, a metal or a plastic. However, the preform is preferably implemented from a thermoplastic selected from the group of polyethylene (PE), low-density polyethylene (LDPE), linear low-density polyethylene (LLDPE), high-density polyethylene (HDPE), high-heat-stability polyethylene (PE-HWST), polypropylene (PP), polyvinyl chloride (PVC), polycarbonate (PC), copolyester, acrylonitrile-butadiene-styrene copolymer (ABS) or styrene acrylonitrile (SAN); an elastomeric material, selected from the group of ethylene-propylene-diene monomers (EPDM) and liquid silicone (LSR); a thermoplastic elastomeric material (TPE), preferably based on urethane or as a styrene block copolymer, a multicomponent plastic, selected from a mixture of polyethylene (PE) and polypropylene (PP), polypropylene (PP) and a thermoplastic elastomeric material, polycarbonate and a thermoplastic elastomeric material, and acrylonitrile-butadiene-styrene copolymer (ABS) and polypropylene (PP). The preform is particularly preferably implemented from high-density polyethylene (HDPE), polypropylene (PP), low-density polyethylene (LDPE), linear low-density polyethylene (LLDPE), high-heat-stability polyethylene (PE-HWST) or acrylonitrile-butadiene-styrene copolymer (ABS). The preform is most preferably implemented from high-heat-stability polyethylene (PE-HWST). The preform can be produced directly by means of extrusion, or from a semifinished product, for example, a round profile. The preform can also be turned as a polygonal profile, for example. Alternatively, the preform can also be injection molded.

The recess preferably also has an oblong shape, and may extend in the longitudinal direction of the preform. The recess may be a hole which extends into the interior of the preform. In particular, the recess can be a through hole or a continuous cylindrical borehole, which can be created by drilling. Depending on the geometry of the channel to be implemented, however, holes having non-round cross sections are also conceivable. Such roles are producible by means of milling, for example. The preform including the recess can also be injection molded. Alternatively, the recess can also be implemented as an oblong flute or groove on a surface of the preform. In such a case, only a partial cross section of a channel is implemented by the channel implementation element, and to implement an internal channel having a closed cross section, the partial cross section of the channel must be connected at least to a further partial cross section of the channel, by connecting the preform at least to a further preform, for example, by welding. Furthermore, the channel implementation element is implemented so it can be demolded, so that easy demolding capability is ensured.

The object of the recess is in particular to keep the quantity of the material of the preform to be melted as small as possible and to enable at least a part of the molten material to be able to be pushed by the channel implementation element in the moving-in direction in front of it. For this reason, it is not absolutely necessary for the recess to be a through hole, as long as at least one reservoir is provided in the recess, which can receive the occurring quantity of molten material. The diameter of the recess is to be large enough that the channel implementation element can be pressed into the preform without an excessively high resistance and without the molten material swelling out of the recess opposite to the moving-in direction. For example, the recess can have a diameter larger than approximately 1 mm for this purpose. On the other hand, the diameter of the recess is to be small enough that a sufficient amount of molten material and a sufficiently high pressure can be created in the interior of the preform to implement the channel cleanly. The recess preferably has, at least in a dimension or direction transversely to the moving-in direction, a diameter which is smaller than the diameter of the channel implementation element in the same dimension or direction. Furthermore, the recess preferably has a diameter in each dimension or direction transversely to the moving-in direction which is less than the diameter of the channel implementation element in the same dimension or direction. In other words, the channel implementation element preferably presses against the preform around its entire circumference.

The channel implementation element may be produced from a high-heat-stability material. For the machining of a preform made of a thermoplastic plastic, the channel implementation element can be produced from steel or aluminum. For the implementation of high surface qualities of the channel and for easier demolding, the channel implementation element can be honed, ground, or polished. The surface of the channel implementation element can also be at least partially coated, for example, using polytetrafluoroethylene.

The temperature of the channel implementation element before moving into the recess is greater than the melting temperature of the material of the preform and preferably less than the decomposition temperature of the material of the preform. However, a temperature range above the decomposition temperature is also possible. The decomposed material is then also discharged from the preform by the channel implementation element. The temperature to be set of the channel implementation element is thus predominantly dependent on the material used for the preform. Furthermore, the temperature to be set is dependent on the geometry (for example, the length, the cross section, or the cross-sectional profile, etc.) of the channel to be created and/or on the surface quality to be achieved of the channel. For example, the optimum temperature of the channel implementation element for low-density polyethylene (LDPE) is to have a value at least between approximately 100° C. and approximately 110° C., for high-density polyethylene (HDPE) between approximately 125° C. and approximately 135° C., or for linear low-density polyethylene (LLDPE) between approximately 122° C. and approximately 127° C. The channel implementation element is preferably to have, during the implementation of the channel, a temperature greater than the mean melting temperature of the material used for the preform, but the temperature is to be less than the decomposition temperature of the material used for the preform. The temperature is preferably greater than approximately 110% (more preferably greater than approximately 120%) of the mean melting temperature of the material used for the preform and/or less than approximately 90% (more preferably less than approximately 80%) of the mean decomposition temperature of the material used for the preform. For example, the decomposition temperature of HDPE is between approximately 487° C. and approximately 497° C., so that the (arithmetically averaged) mean decomposition temperature is 492° C. Furthermore, the melting temperature of HDPE is between approximately 125° C. and approximately 135° C., so that the (arithmetically averaged) mean melting temperature is 130° C. The heat for heating the channel implementation element can be introduced from the outside, for example, by means of thermal radiators. The channel implementation element preferably includes an internal heating device, however. This enables the channel implementation element to also be heated or warmed during the movement into the recess of the preform. The heating device can comprise at least one heating cartridge, for example. Furthermore, the channel implementation element can comprise temperature probes, so that the temperature of the channel implementation element can also be detected during the movement into the recess of the preform and can be regulated such that it keeps a constant value, or assumes another optimum curve. If an internal heating device is not used (for example, if the channel implementation element is externally heated by means of an IR radiator and/or a hot fluid (for example, hot air) flows through it for heating), it is advantageous for the channel implementation element to be heated to a temperature significantly greater than the melting temperature of the material of the preform, since the channel implementation element cools upon plunging into the preform. In the case of a preform made of HDPE and use of a heating cartridge having integrated measuring sensors for heating the channel implementation element, for example, the heating cartridge is controlled or regulated such that the temperature probe measures a temperature of between approximately 150° C. and approximately 320° C., preferably between approximately 170° C. and approximately 280° C., most preferably between approximately 180° C. and approximately 250° C. It is therefore possible that the surface temperature of the channel implementation element for HDPE (for example, because of the occurring heat losses) is preferably between approximately 180° C. and approximately 220° C.

The external contour of the channel implementation element at least regionally corresponds to the internal contour of the channel to be implemented. In the case of an oblong recess, which extends in the longitudinal direction of the preform into the interior of the preform, in particular in the form of a cylindrical borehole, the channel implementation element also has an oblong shape or a shape of a mandrel. Such a mandrel is moved coaxially with the longitudinal axis of the recess into the recess, wherein in the end position of the movement in, the cross section of the mandrel corresponds to the cross section of the channel at the corresponding position. In the case of a recess, which is implemented as an oblong flute or groove on a surface of the preform, the channel implementation element can also have a different shape or external contour, for example, the shape of a plate which is moved with the long edge or end face into the flute or groove. In such a case, the moving-in direction is perpendicular to the longitudinal direction of the channel to be implemented, and the partial cross section of the front region of the long edge or end face of the channel implementation element transversely to the longitudinal direction of the channel to be implemented corresponds to the partial cross section of the channel to be implemented. Depending on the desired internal contour of the channel, any external contours of the channel implementation element are conceivable. The channel implementation element can have, transversely to the moving-in direction into the recess, for example, a round, oval, elliptical, triangular, rectangular, square, or pentagonal, hexagonal, or polygonal cross section or a combination thereof. The channel implementation element can also have a screw profile, to implement a channel having a screw profile. In the case of a mandrel-shaped channel implementation element, the channel implementation element must be rotated about its longitudinal axis at least during the movement out of the recess, and preferably in the reverse rotational direction also during the movement into the recess.

The relative movement of the heated channel implementation element and the preform toward one another may be performed by a pressing device. The pressing device can comprise a workpiece receptacle and a chucking device for the channel implementation element. Workpiece receptacle and chucking device can be arranged opposing on a carriage, so that they can be mutually displaced. In other words, workpiece receptacle and/or chucking device can be moved linearly toward one another or away from one another. In this case, a precise and correct alignment of the preform and the recess in relation to the channel implementation element is important, wherein this alignment is preferably performed by means of a conical chucking device. In particular, for example, in the case of a cylindrical recess and a mandrel-shaped channel implementation element, the longitudinal axis of the recess and the longitudinal axis of the channel implementation element are to be aligned coaxially. A cylindrical shape of the preform is advantageous for the precise correct chucking of the preform in the tool receptacle. For the precise and correct chucking of the channel implementation element in the chucking device, the channel implementation element can have a preferably cylindrical or conical chucking region, which adjoins the channel implementing part. The chucking region of the channel implementation element can preferably contain the heating device.

By moving the preform and the channel implementation element toward one another, the heated channel implementation element is at least regionally moved into the recess in a moving-in direction, wherein the material of the preform in a region around the recess is at least partially melted and is at least partially displaced by the channel implementation element. In other words, the channel implementation element is plunged or pressed into the preform. The preform does not have to be warmed or heated before pressing in the channel implementation element, wherein such an embodiment would be conceivable, however. It would also be conceivable to cool the preform before pressing in the channel implementation element, or to bring it to a predefined temperature. The optimum pressing-in force and advance speed are dependent on the factors such as the size of the channel to be implemented, the size ratio of the channel implementation element in relation to the recess, the material of the preform, and the temperature of the channel implementation element. In the case of excessively high advance speeds or pressing-in forces and excessively low temperatures of the channel implementation element, roughly formed channels and high surface roughnesses of the channels occur. The speed must advantageously be selected so that the material can be melted and displaced in front of and at the channel implementation element, but the channel implementation element does not cool down excessively strongly during the plunging. In the case of excessively low advance speeds or pressing-in forces and/or excessively high temperatures of the channel implementation element, it can occur that an excessive amount of material will melt and begin to flow in an uncontrolled manner. The preform and the channel implementation element can be moved toward one another at a speed of between approximately 4 to approximately 12 mm/s, preferably at a speed of between approximately 6 to approximately 10 mm/s, particularly preferably at a speed of approximately 8 mm/s.

The preform may be implemented at least partially from high-density polyethylene (HDPE) and the channel implementation element is heated to a temperature at the surface of between approximately 180° C. and approximately 220° C.

The temperature of the channel implementation element may be greater than approximately 110% (more preferably greater than approximately 120%) of the mean melting temperature of the material used for the preform and/or less than approximately 90% (more preferably less than approximately 80%) of the mean decomposition temperature of the material used for the preform.

The method according to the invention offers the following advantages in relation to conventional methods for implementing channels:

Because the preform is only locally heated and material is only melted in the region around the recess, only minor shrinking of the overall material of the preform takes place. This also enables, in addition to a high component precision, that no or only a slight demolding bevel is required on the channel implementation element, to reliably separate the channel implementation element from the preform after implementation of the channel. This in turn enables the implementation of channels having constant cross section and constant wall thicknesses over the entire component length, which is advantageous, for example, for the usage case in a device for ultrasound flow rate measurement for high reproducibility of the measurement results.

Furthermore, channels having high or fine surface qualities can be implemented in one process step by the method according to the invention. The method thus becomes rapid and cost-effective. The particularly good surface quality results in optimum flow behavior of a fluid in the interior of the channel, since no turbulence results due to high surface roughnesses, machining grooves, or mold parting lines. The high surface quality is also partially to be attributed to the fact that high pressures transversely to the moving-in direction can be generated in the interior of the preform by the solid regions of the preform during the pressing of the channel implementation element into the preform.

The implementation of at least a part of the channel by the channel implementation element enables the material of the preform to be melted exclusively in an adjoining region of the recess, i.e., the region around the recess, while remaining regions of the preform remain in a solid state.

In other words, the material of the preform is only locally melted in the region around the recess, while the external surface of the preform is only heated slightly because of the thermal conductivity of the material.

This advantageously enables the chucking of the preform in a tool receptacle and therefore simple machining. Furthermore, slight shrinking of the overall material of the preform takes place, wherein this can be considered for correct implementation of the channel. More advantageously, during the pressing of the channel implementation element into the preform, high pressures can be generated in the interior of the preform transversely to the moving-in direction, since the solid shell of the preform holds together the preform.

The channel implementation element may be moved out of the preform after cooling and at least partial solidification of the molten material of the preform.

During the cooling and solidification of the molten material of the preform, the preform is brought into a state in which the channel implementation element can be removed from the preform, without the preform being deformed or damaged, or without the surface quality of the channel being reduced. The material of the preform does not necessarily have to be brought to room temperature in this case. It can be sufficient if the temperature is less than the softening temperature of the material of the preform, for example. It is advantageous that the material is cooled to a temperature at which the material no longer flows and remains plastically stable. The surface quality of the implemented channel is dependent on the surface quality of the channel implementation element and the dwell time of the channel implementation element in the preform. The channel implementation element can be moved out of the preform at a speed of between approximately 1 to approximately 9 mm/s, preferably at a speed of between approximately 3 to approximately 7 mm/s, particularly preferably at a speed of approximately 5 mm/s. The speed of the moving out is preferably less than the speed of the moving in. For more rapid cooling, cooling from the outside can be provided, for example, a fan. Alternatively or additionally, the channel implementation element can have a cooling device, which actively cools the channel implementation element, for example, a cooling circuit or a Peltier element.

A high contour precision and surface quality of the channel are advantageously achieved by the cooling and at least partial solidification of the molten material of the preform in the state of the inserted channel implementation element.

The channel implementation element may have a varying cross section at least regionally along an implementation direction of the channel.

A channel having a cross section that varies over its longitudinal direction can advantageously be created by such a configuration of the channel implementation element. The varying cross section is provided in this case at least in the region of the channel implementation element which implements the channel, i.e., which is inserted into the preform. The cross-sectional variation may be implemented such that the channel implementation tapers in the moving-in direction, i.e., the cross section decreases toward the tip of the channel implementation element.

The recess may be at least partially an essentially cylindrical recess, which has an axial length greater than its diameter; the channel implementation element has the shape of a mandrel; and the moving-in direction of the channel implementation element into the recess corresponds to the axial direction of the recess.

The cylindrical recess can extend through the preform, i.e., can be open at both ends of the preform. The recess can have a region having a widened diameter at its end facing away from the channel implementation element or at its side facing away from the channel implementation element. This region having widened diameter can be referred to as a reservoir, which can receive molten material which is displaced by the channel implementation element or pushed in front of it. In this way, the molten material can be prevented from being squeezed out of the preform by the channel implementation element, and molten or decomposed material can be prevented from being discharged from the preform. The region of the reservoir is preferably cut off after the implementation of the channel.

The method according to the invention may comprises: providing a plurality of preforms; implementing a part of the channel in each of the preforms by means of the channel implementation element; and connecting the preforms to one another such that a continuous channel is implemented.

In other words, channels can be implemented separately in various preforms according to the invention and the products resulting therefrom can be assembled or joined together as intermediate products, which in turn represent "preforms" or "blanks", to form a further product.

For this purpose, the parts of the channels in the preforms are implemented according to the above-described method according to the invention. The preforms may be connected to one another after the implementation of the parts of the channels. The connecting can be welding, for example. The preforms can also be connected by adhesive technology, preferably by gluing methods or extrusion coating methods, or mechanically, preferably by screwing or clamping them together. Thus, channels having arbitrary lengths can be created. Preferably, parts of channels or channel sections having a length of between approximately 10 mm and approximately 150 mm, preferably of between approximately 30 mm and approximately 120 mm, more preferably of between approximately 40 mm and approximately 90 mm can be implemented in each of the preforms.

The preforms may be connected by welding, wherein at least one welding flange is implemented on the surfaces of the preforms to be welded. The welding flange is used in particular as a welding dam, which is melted and/or plastically deformed during the welding process and is used for a material bond and/or form fit with the complementary preform. The welding dam is thus used as an additional material provider during the welding process. In this case, the welding dam is arranged symmetrically around the channel contour.

The preforms may comprise: a stop flange, which is used as a stop and/or sealing flange of the parts of the channels of the preforms; wherein the stop flange is preferably arranged radially inside the welding flange; and/or a vision protection flange, which is used as a vision protector and is preferably arranged radially outside the welding flange. The vision protection flange therefore conceals the actual weld seam. The flanges (i.e., the welding flanges, the stop flanges, and/or the vision protection flanges) are preferably implemented in the preforms after the implementation of the respective parts of the channel to be implemented. Before the implementation of the flanges (welding, stop, and/or vision protection flanges), regions of the preform, in which irregularities have formed due to the molten material displaced by the channel implementation element, can be cut off. The flange or the flanges can be implemented by turning and/or milling. The (preferably external) vision protection flange can be implemented as a ring-shaped or closed, circumferential projection, so that a corresponding preform to be welded having a stepped region of smaller diameter can be introduced at the end to be welded into the inner region of the external flange. The (preferably external) vision protection flange is thus implemented only on one of the two preforms to be welded, while in contrast the other of the two preforms to be welded (preferably externally) has a stepped region, which has a smaller diameter than the internal diameter of the vision protection flange. The welding flange can also be implemented as a ring-shaped or closed, circumferential projection, wherein this flange protrudes more than the other flanges from the preform, to ensure a contact of these regions of the preforms during the welding and to weld as much material as possible to one another. The (preferably internal) stop flange is preferably also implemented as a closed, circumferential projection, wherein, however, the internal contour of the flange corresponds to the contour of the channel, and wherein this flange protrudes less than the other flanges from the preform. The stop flange preferably has planar stop surfaces essentially perpendicular to the longitudinal direction of the channel. The advantage of the stop flange is in particular the thus simplified smooth implementation of the channel also in the transition region between the preforms.

The connecting of the preforms may comprise aligning and guiding the preforms to be connected by inserting a guide mandrel having an external contour, which at least regionally corresponds to the internal contour of the parts of the channel of the preforms to be welded, wherein the guide mandrel is inserted through the part of the channel of one preform at least partially into the part of the channel of the other preform. In the case of a welded connection, connecting with the inserted guide mandrel can further comprise: melting the material of the region to be welded of the preforms; and pressing the preforms against one another along the guide mandrel to weld the preforms. The guide mandrel therefore enables an alignment of the preforms in relation to one another and prevents any welding material from being able to penetrate into the channel during the welding.

However, an alignment mandrel is also conceivable, which is provided at a height stop in the respective collet chuck for the preforms, so that the collet chucks are aligned correctly in relation to one another.

In particular, the preform only begins to melt during the melting, wherein its material is partially liquefied, but preferably no additional material is applied.

The melting of the material of the region to be welded of the preforms can be performed, for example, by means of a heating plate or by means of a laser or by means of microwaves. However, the preforms can also be ultrasonically welded or vibration welded, wherein then the melting of the material and the pressing against one another can be performed simultaneously. The preforms are pressed against one another and moved toward one another during the welding until the stop faces of the internal flanges come to a stop and a continuous, sealed channel is implemented. Since a relative displacement of the preforms in relation to one another takes place during the welding of the preforms by way of the melting of the material, the guide mandrel can be configured to follow the movement of a preform.

The parts of the channels of the respective preforms advantageously may be aligned precisely in relation to one another by the guide mandrel, so that after the welding of the preforms, an essentially smooth transition results in the interior of the channel. Furthermore, the guide mandrel applied over the entire surface prevents molten material from reaching the interior of the channel during the welding or, for example, adhesive in the case of an adhesive bond.

The method according to the invention may comprise providing three preforms; implementing a first part of the channel in a first of the preforms by means of a first channel implementation element in the form of a mandrel, wherein an insertion section of the first channel implementation element at least regionally has a cross section which continuously varies toward the tip of the first channel implementation element, wherein the cross section varies toward the tip from an essentially round to an essentially rectangular cross section; implementing a second part of the channel in a second of the preforms by means of a second channel implementation element in the form of a mandrel, wherein an insertion section of the second channel implementation element has an essentially rectangular cross section, which corresponds to the rectangular cross section in the region of the tip of the first channel implementation element; implementing a third part of the channel in a third of the preforms by means of the first channel implementation element; and, after the implementation of the parts of the channel, connecting the first and the third preforms to the second preform such that a continuous channel is implemented, wherein the cross section of the channel first continuously changes from an essentially round cross section to an essentially rectangular cross section, and continuously varies toward the end of the channel from the essentially rectangular cross section to the essentially round cross section.

The insertion section of the channel implementation element means the section which is located in the interior of the preform in the end position of the channel implementation element in the moving-in direction into the preform, i.e., in the completely inserted state. It can be advantageous for the first channel implementation element to have a region having a constant cross section in the region of its tip or at its front end. It can thus be ensured that the contours of the channels of the preforms to be welded correspond, even if a part of the end of the preform is cut off, for example, for deburring and/or for implementing the welding flange. The essentially rectangular cross section of the channel implementation element or the channel can be an essentially square cross section. Furthermore, the corners of the essentially square channel cross section can be chamfered.

Advantageously, a high-quality channel for a through flow part in a device for installation in a hose and/or pipe system and for attaching flow rate measuring sensors can be produced cost-effectively and simply by the above-described method. In particular, after the implementation of the channel, the preform can be externally machined, for example, by cutting machining such as turning and milling, to thus create a product having a desired external contour or external shape.

According to a further aspect of the invention, a product is provided, comprising at least one channel, wherein the channel was implemented by melting material of the product by means of a channel implementation element inserted into the product and subsequently solidifying the material; at least a part of an external contour of the channel implementation element at least regionally corresponds to an internal contour of the channel; and the channel implementation element was heated to a temperature above a melting temperature of the material of the product, to melt the material of the region of the product implementing the channel.

The product according to the above aspect of the invention can be produced, for example, by the method according to the invention for implementing a channel. The statements made above on the method according to the invention also apply accordingly to the product according to the invention.

The inner surfaces of the channel may have a surface roughness of approximately less than Ra≤1 μm, preferably Ra≤0.5 μm, more preferably Ra≤0.2 μm, still more preferably Ra≤0.15 μm.

Surface roughnesses can be measured in various ways. In particular, the surface roughness is preferably measured using a perthomether from Zeiss according to DIN EN ISO 4287.

The external shape of the product may be created by cutting machining.

The cutting machining can comprise milling and/or turning.

The product may be implemented from a plurality of subsections welded to one another, wherein the channel extends through the subsections.

The product may be a through flow part having a centrally arranged and deformable region having rectangular external cross section, wherein two opposing sensor contact surfaces and two opposing pressure region surfaces are arranged on the external surface of the centrally arranged region, and wherein two attachment regions for attachment to hoses and/or plastic pipes flank the centrally arranged region.

The cross section of the channel may merge in the attachment regions from an essentially round into an essentially rectangular cross section.

The pressure region surfaces and the sensor contact surfaces of the centrally arranged region may be connected to one another via thin points, preferably film hinges, joints, or via a multicomponent plastic system.

The sensor contact surfaces may be flat external surfaces, and/or the sensor contact surfaces are arranged in parallel to one another.

The pressure region surfaces may have profiles as contact surfaces for a flow rate measuring device to be closed around them by pressure.

The product may be composed of up to three individual parts, comprising the centrally arranged region and the attachment regions flanking the centrally arranged region.

In particular, the product can be used as a through flow part in a device for installation in a hose and/or pipe system and for attaching flow rate measuring sensors.

Flow rate measurements are carried out in pipe and hose systems in a variety of methods in the automation of industrial or laboratory processes. For this purpose, flow rate meters are installed wherever the instantaneous delivery in the pipe or hose network is to be detected or also the flow rate is to be monitored and further processed. In this case, the flow rate measurement forms, in addition to temperature, pressure, and force, one of the most important variables in industrial measuring technology and is an essential foundation of process automation. Particular advantages of external flow rate measurements are, inter alia, the contactless measurement of the medium and the contamination hazard which is thus preferably eliminated, specifically also during the cleaning of the fluid system. In addition, a high precision can thus be ensured even at low flow rate speeds.

The flow rate measurements in automated processes vary depending on the measurement method and the medium to be measured. One differentiates in this case between mechanical-volumetric, thermal, acoustic, magnetic-inductive, optical, gyroscopic, or effective pressure/congestion methods. All methods share the feature, however, of recording specific physical properties, for example, temperature, pressure, sound, acceleration, speed, etc., via a measurement transducer.

In the case of closed pipe or hose line systems, the flow rate measurements are divided into two subgroups depending on the medium and output signal: namely volume flow rate and mass flow rate. Furthermore, one differentiates depending on the measurement arrangement between so-called clamp-on flow rate measuring devices and in-line flow rate measurements. In the case of the in-line flow rate measurements, the measuring sensors are attached in the flow profile of the medium to be measured, while in contrast the clamp-on systems are placed and clamped externally onto the pipe or hose.

Such a clamp-on system is described in JP 04940384 B1. It discloses an ultrasonic flow rate measuring device in which a hose, through which the fluid to be measured flows, is laid in a hinge measuring device and fixed by pressing together the measuring device. The flow profile of the medium to be measured is converted into a nearly rectangular profile by the deformation of the hose. However, severe measurement inaccuracies can occur during the determination of the volume flow rate due to variations in the density and the thickness of the hoses used and the variations of the internal cross section thus caused. Both the reproducibility of the measurement results and also the calibration of the overall system are thus also strongly impaired. In addition, the hose can bend or twist within the measuring unit during the application or can kink directly after the measuring unit, which also results in measurement inaccuracies.

For rigid pipe systems, a fixed component is known from U.S. Pat. No. 6,026,693, which can be installed via corresponding fittings or flanges in a pipe system. Ultrasound measuring sensor pairs are externally attached directly behind the flange regions on the rectangular component. The fluid to be measured is converted without transition from a round into a polygonal flow profile by the component. Due to the abrupt transition from a round into a polygonal flow profile, turbulent flows occur, which can negatively influence the flow rate measurement. The rigid component is suitable for fixed pipelines having diameters of 2 to 24 inches (5.08 to 60.96 cm). No variance with respect to the measurement transducers to be attached, on the one hand, and the pipe diameter, on the other hand, is possible due to the structural unit made of sensors and the actual flow rate component having defined cross section.

It would therefore be advantageous to provide a device for flow rate measurement, which is suitable for use in a plastic hose and/or plastic pipe system and avoids the above-mentioned disadvantages in the prior art in this case. Furthermore, it would be advantageous to provide a method for flow rate measurement using such a device.

The product according to the invention is suitable as a through-flow part, in particular as a through-flow plastic part, for a device for installation in a plastic hose and/or plastic pipe system and attachment of flow rate measurement transducers, which has the through-flow plastic part as a hollow body having a centrally arranged and deformable region having rectangular cross section, wherein two opposing sensor contact surfaces and two opposing pressure region surfaces are arranged on the external surface of the centrally arranged region, and wherein two attachment regions for attachment to hoses and/or plastic pipes flank the centrally arranged region.

The product is designed so that a sensor sleeve or a sensor housing can be externally attached. A signal transmission to ascertain the flow rate takes place as soon as the sensor contact surface of the through-flow plastic part is applied over a large area to the sensor surfaces in the sensor housing. For this purpose, the product is installed in a hose or plastic pipe system, by fastening the hoses to the attachment regions. Subsequently, the device is laid with one of the pressure region surfaces oriented downward in a sensor sleeve or the sensor housing. Due to the cover of the sensor housing or the sensor sleeve to be closed above the second pressure region surface, the through-flow plastic part experiences a pressure force in the centrally arranged region. This pressure force ensures a slight deformation of the plastic part, during which the pressure surface, in a downward movement, ensures a lateral displacement of the sensor contact surfaces in the direction of the measurement transducers in the sensor sleeve. The measurement precision is increased by the product in the form of a through-flow plastic part, since no further deformation of the pipes or hoses adjoining thereon, in which the measured fluid flows, is necessary. In addition, additional means for establishing contact between sensor contact surfaces and the actual sensors can be substantially omitted.

In this context, the term "deformable" defines the material of the centrally arranged region of the through-flow plastic part in greater detail. In this region, the material is deformable in such a manner that a deformation of the region takes place due to the pressure provider from the outside, for example, the cover of the sensor sleeve, so that the sensor contact surfaces press against the measurement transducers in the sensor sleeve. The sensor contact surfaces do not have to press against the measurement transducers 100% in this case, but do have a minimum contact surface to the measurement transducers which is required for the measurement. The minimum contact surface is dependent in this case on the type and arrangement of the sensors, for which the through-flow plastic part is conceived. However, a minimum contact is generally achieved, in which additional aids, such as contact gel, can be omitted. The deformation is to a slight extent and is many times less than in the case of the clamp-on hose systems, in which the hoses are compressed into a rectangular cross section. Depending on the selected plastic material, however, the deformation can also be an elastic or partially elastic deformation. The deformation is preferably induced by mechanical pressure buildup, for example, by manually closing the sensor cover. Further possibilities for a pressure for deforming the through-flow plastic part are dependent on the type and shape of the measurement transducer to be attached. In addition to a mechanically exerted pressure force, for example, a pneumatic actuation is also conceivable.

The term "rectangular" with regard to the shape of the hollow body in the centrally arranged region is understood as an essentially rectangular shape, which can have slight bevels or rounded areas in the corners, however. Depending on the deformability and selection of the plastic material, slight deviations in the rectangular shape can therefore occur. However, the basic shape of the centrally arranged region remains rectangular or even square.

Because of the tolerances in the production of plastic parts and in the production of sensor housings or sleeves, i.e., because of the spacing of the sensors to one another linked thereto, it can occur in the prior art that the sensor contact surfaces of the plastic part and the measurement transducers in the sleeve do not touch. In the present invention, due to the deformability of the component, an optimum contact between sensor contact surfaces and the sensors and therefore also an optimum signal transmission can be ensured. In addition, further aids for signal transmission, for example, contact gel, can be substantially omitted, since they cause soiling of the sensor housing, inter alia, and make operation more unpleasant and complex as a result.

To get from a round flow profile in the attached plastic pipes or plastic hoses to a polygonal flow profile in the centrally arranged region of the device, in one of the embodiments, the internal cross section merges in the attachment regions from a round into a rectangular cross section. The route in the attachment regions is embodied linearly in relation to the centrally arranged region. Interfering flow influences, for example, Coriolis force, and measurement inaccuracies resulting therefrom are thus avoided.

The length of the transition regions is dependent in this case on the diameter of the connected pipes or hoses and also the size and the precise cross section of the desired measurement region in the middle part. In this case, the measurement region can vary depending on the measurement principle and the arrangement of the individual sensors. The attachment regions are dimensioned in accordance with the measurement method used and the number and arrangement of the sensors, which is linked thereto. The transition from the round into the polygonal internal cross section takes place in such a manner that turbulent flows or tear away of the flow of the fluid to be measured are prevented.

In a further embodiment of the product according to the invention, the pressure region surfaces and the sensor contact surfaces of the centrally arranged region are connected to one another via thin points, preferably film hinges or joints, or via a multicomponent plastic system.

Additional flexibility with respect to the deformability in the centrally arranged region of the device is achieved by the thin points. Thus, an undesired lens effect can be avoided in the case of the lateral displacement of the sensor contact surfaces, i.e., the rectangular cross section is maintained in spite of compression of the centrally arranged region. In addition, an even more targeted direction of the deformation of the device material is predefined by the thin points. Film hinges suggest themselves in particular for this purpose, which are known per se from the field of plastic packages, for example, in soap bottles having snap-open lid. In the present invention, the flexibility thus resulting was used for the oriented deformability of the plastic material, to assist the precisely fitted deformation of the sensor contact surfaces in relation to the sensor. In dependence on the selected plastic material, both film hinges or joints and also systems made of multiple plastics are used as thin points. In the case of the multicomponent systems, a comparatively soft material in relation to the plastic used for the rest of the device is used for this purpose at the desired thin points.

In a further embodiment of the product according to the invention, the sensor contact surfaces have flat external surfaces.

The largest possible contact surface for the measurement transducers with the sensors contained therein is enabled by the flat external surfaces. The design of the surfaces is performed in dependence on the measurement method and the arrangement of the sensors linked thereto. An ultrasonic flow rate meter measures the flow rate speed in the measurement section by means of two sensor arrangements opposite to one another. The sensors are arranged at an angle to one another, so that one sensor is installed somewhat further downstream than the other. The flow rate signal is ascertained by alternately measuring the run time of an acoustic signal from one sensor to the other, wherein the effect is utilized that sound is transmitted more rapidly with the through-flow direction than against the through-flow direction. The volume flow is then ascertained by sequential measurement between all sensor pairs in the arrangement.

To further increase the measurement precision, in one of the embodiments, the sensor contact surfaces are arranged in parallel to one another. Therefore, in particular for clamp-on measurement systems, the sensor contact surfaces are thus adapted as precisely fitting as possible to the sensors in the measurement transducer.

The pressure region surfaces each adjoin the sensor contact surfaces approximately perpendicularly and define two further sides of the centrally arranged region of the device. In one of the embodiments, the pressure region surfaces have profiles as contact surfaces for a flow rate measuring device to be closed around it by pressure.

The profiles are used to ensure a uniform pressure distribution. In addition, the grip for the respective pressure provider is increased by the profiles. However, the shape of the profiles is also dependent on the manufacturing of the plastic part. Thus, a rib structure may be produced particularly well in the injection molding method. Simultaneously, the rib structure offers the advantage that the pressure can be distributed via the long middle rib and the adjoining transverse ribs optimally over the entire surface. However, other embodiments of the profiles are also implementable.

As already mentioned, the pressure exerted on the pressure region surfaces can be performed mechanically, for example, by manual actuation, or pneumatically. Depending on the measurement transducer and the handling thereof, the profiles are placed and formed at or on the pressure region surfaces of the device.

In a further embodiment of the product according to the invention, the through-flow plastic part is composed of up to three individual components, comprising the centrally arranged region and the two attachment regions flanking the centrally arranged region.

The flexibility with respect to the use of the device is thus increased in particular. The attachment regions are dimensioned in accordance with the hoses or pipes to be connected and the centrally arranged region can be replaced accordingly depending on the measurement method, if the diameter is also adapted here to the attachment regions and the volume flow to be expected. In one preferred embodiment, the cross-sectional area of the connected hose or plastic pipe is equal to the internal cross-sectional area of the through-flow plastic part. Furthermore, a multipart implementation enables flexible production, since the product can thus advantageously be produced by the method according to the invention. In addition, in the case of a multipart embodiment of the through-flow plastic part, asymmetrical shapes can also be used. This is advantageous, for example, if one wishes to change from a large to a small hose diameter over the running section of the component or to specify the flow direction using the shape. The individual components can additionally be made in different colors, for example, to make the handling easier during assembly.

In the embodiment made of up to three individual components, they are thermally connected to one another, preferably by welding methods or hot stamping methods, by adhesive technology, preferably by gluing methods or extrusion coating methods, or mechanically, preferably by screwing or clamping them together.

The above-described advantages with respect to the multipart construction require a precisely fitted joining together of the individual parts to form the final product. Various methods have proven themselves for this purpose, which may be divided into thermal, adhesive technology, or mechanical connection methods depending on the selected plastic. In the case of the thermal methods, above all the classical plastic welding methods, i.e., heating element welding, ultrasonic welding, laser welding, induction welding, or vibration welding are applied. The mentioned welding methods are material bonding joining methods, in which the plastic is plasticized. Exclusively thermoplastics are suitable for the welding methods, since only these can form a melt. In the case of heating element welding, the individual parts are initially melted at the contact points separately from one another by means of heating elements and subsequently stuck together. A very solid and also hermetically sealed connection is thus produced, which is free of additional connecting agents, for example, adhesives. Additional adhesive agents are often undesirable in this context, since they can decompose in later operation and components can possibly diffuse into the device and thus possibly contaminate the product. Nonetheless, adhesive methods also offer advantages depending on the plastic, for example, if the plastic cannot withstand thermal stress. In the case of the extrusion coating methods, additional material is introduced, precisely as in the case of the adhesive methods, and the individual components are extrusion coated or sheathed either using the same plastic or also using a material deviating from the actual device material at the corresponding connection points. In the case of the mechanical connection, screw threads, coupling parts, or the like are provided on the individual components. Simply plugging together and additional fixing with the aid of hose clamps are also possible.

In a further embodiment of the product according to the invention, the through-flow plastic part, before the implementation of the channel, is produced in the injection molding method, preferably the multicomponent injection molding method, by extrusion, by mechanical machining of a plastic blank, preferably by turning and/or milling, or by a prototyping method, selected from the group of vacuum die casting methods, 3-D printing methods, laser sintering, or stereolithography.

The selection of the method is also essentially dependent here on the selection of the plastic used, since not every plastic is similarly suitable for every manufacturing method. The selection of the plastic is in turn strongly dependent on the application. The individual stress parameters due to pressure, temperature, mechanical strain, media resistance, ability to be sterilized, and the suitable for specific applications, for example, in the pharmaceutical or medical field, play a decisive role here.

In a special embodiment, the through-flow plastic part is produced from a thermoplastic, selected from the group of polyethylene (PE), high-density polyethylene (HDPE), polypropylene (PP), polyvinyl chloride (PVC), polycarbonate (PC), copolyester, acrylonitrile-butadiene-styrene copolymer (ABS) or styrene acrylonitrile (SAN); an elastomeric material, selected from the group of ethylene-propylenediene monomer (EPDM) and liquid silicone (LSR); a thermoplastic elastomeric material (TPE), preferably based on urethane or as a styrene block copolymer; a multicomponent plastic, selected from a mixture of polyethylene (PE) and polypropylene (PP), polypropylene (PP) and a thermoplastic elastomeric material, polycarbonate and a thermoplastic elastomeric material, and acrylonitrile-butadiene-styrene copolymer (ABS) and polypropylene (PP).

As already described above, the selection of the plastic is dependent both on the desired application of the device and also on the costs for the production method thereof. In a special embodiment, the device is intended as a single-use article, so that the known thermoplastics polyethylene or polypropylene are already used for such applications for reasons of cost. In the case of the multicomponent plastics, various material properties may be combined with one another, for example, an increase in the deformability may be achieved by combination with a thermoplastic elastomeric material.

In a further embodiment, the product withstands an operating pressure=6 bar, preferably =5 bar, and a safety pressure=7 bar, preferably =8 bar.

The operating pressure therefore also has influence on the dimensioning of the overall device. In dependence on the operating pressure, but also the operating temperature, the duration of the load (operating duration), and the specific material properties, the specific design of the device is therefore performed. The design of the device is additionally dependent on the fluid to be measured and the specific properties thereof. For this purpose, these can be pure liquids, liquids having gas enclosures, i.e., dissolved gases or gas bubbles, or also liquid-solid systems, for example, diatomite filter particles in a carrier fluid.

As already mentioned above, the product is therefore designed so that it withstands a temperature of approximately 5 to 50° C., preferably approximately 10 to 37° C., particularly preferably approximately 15 to 25° C.

These temperature ranges are, on the one hand, compatible with the use of plastic and, on the other hand, adapted to the applications of the device, in particular in the biopharmaceutical, food technology, or chemical fields. In the production of biopharmaceuticals, the temperature range is dependent on the cultivated organisms and the temperature profile thereof and also the biochemical products, for example, proteins and the temperature profile thereof. The device is accordingly adapted to these temperature profiles.

In a further embodiment of the product, the attachment regions are adapted to hose and/or plastic pipe internal diameters of ⅛" to 2", preferably ¼" to 1". For pipe and hose diameters, the unit of measure "is still routine to a person skilled in the art. 1" (inch) corresponds in this case to 1 in (inch), which in turn corresponds to 25.4 mm. These are also the common hose and plastic pipe diameters, which are used as single-use articles in the pharmaceutical, chemical, or food-technology industries and in technical laboratories.

In a further embodiment of the product, it is therefore a single-use article. Because of the high sterility requirements, so-called "single-use" products are encountered ever more frequently for production in particular in the pharmaceutical field, in medicine, but also in the food field. Using the product described here, a further building block is provided for an automated production process in the single-use system. To minimize or even completely preclude contamination, the present product is not intended only for installation on location, but rather is used in particular as a building block in a closed single-use fluid system. For example, the product may be installed for flow rate measurement on a single-use bioreactor, from which, after the fermentation, the culture medium including the target product is transferred into another container for further storage or processing. The overall fluid system, which is connected via sterile membranes to the intakes and outlets, is packaged, sterilized, and the product is therefore delivered as a component of the overall assembly to the final user. After the production, the entire assembly can be disposed of accordingly.

The applications are, as already described, greatly varying and are generally oriented to the claimed industrial branch. In a further aspect of the present invention, the product is therefore used in hose and/or plastic pipe systems, preferably fluid systems, particularly preferably liquid systems, for flow rate measurement in automated industrial or laboratory processes; preferably medical, biotechnology, or food-technology processes.

A method for flow rate measurement is described hereafter, and is characterized by the following method steps:

a) providing a device having a through-flow plastic part as a hollow body having a centrally arranged and deformable region having rectangular cross section, wherein two opposing sensor contact surfaces and two opposing pressure region surfaces are arranged on the outer surface of the centrally arranged region, and wherein two attachment regions flank the centrally arranged region, b) connecting the device from step a) to a hose and/or plastic pipe system and reservoirs connected thereto via the attachment regions to form a closed system, c) introducing the centrally arranged region into a flow rate measuring device having a measurement transducer having at least one sensor pair and a cover for fixedly clamping the flow rate measuring device, wherein the through-flow plastic part having the sensor contact surfaces is arranged in the flow rate measuring device so that at least one sensor pair faces toward the sensor contact surfaces of the through-flow plastic part and the cover lies above one of the pressure region surfaces, d) pressing the sensor contact surfaces in the direction of the sensor pair of the flow rate measuring device by deforming the through-flow plastic part by means of manual contact pressure of the cover via the pressure region surface, and e) connecting the flow rate measuring device to a measurement transformer having analysis unit and carrying out the flow rate measurement.

Using the present method, it is possible for the first time to perform a precise flow rate measurement in hose and plastic pipe systems, without the hoses having to be deformed directly for the measurement and thus creating an increased calibration expenditure. In the present method, however, subsequent calibration is not necessary, since a defined measurement region results by way of the use of the through-flow plastic molded part. The measurement results thus become reproducible and the measurement per se becomes more precise, since the above-described device results in precise geometry and material distribution in the measurement region. For this purpose, in step a), the above-described device is provided. It is attached in step b) via the attachment regions to the hose or plastic pipe systems. "Attached" is understood in this case as any type of connection of the device according to the invention and the hoses or pipes. The hoses can be pushed onto the attachment regions and fixed using hose clamps, for example. Screw threads, couplings, or connection terminals may also be provided in plastic pipes, via which a connection is generated. In step c), the actual measurement arrangement of the device is produced, which is enclosed by a flow rate measuring device, in that the flow rate measuring device has a cover which is closed using pressure, for example, manual pressure, over the pressure region surfaces. By closing the cover in step d), the sensor contact surfaces are pressed outward and therefore moved in the direction of the sensors, which are located in the measurement transducer. Due to this simple handling, generally no further contacting aids are necessary, for example, contact gel, whereby the cleaning effort also becomes superfluous. Subsequently, the flow rate measuring device can be connected to a measurement transformer having analysis unit to carry out the flow rate measurement (step e).

In one embodiment of the method, a sterilization is performed between step b) and c), selected from the group of radiation sterilization, preferably gamma radiation sterilization or electron-beam sterilization, hot steam sterilization, and gas sterilization, of the closed system produced in step b).

The type of the sterilization is dependent in this case on the connected overall system and the degree of the sterilization desired on the application side. In the case of the above-described single-use complete solutions, the overall assembly made of sterile containers, hoses or pipes, and flow rate measuring device is packaged and subsequently sterilized according to one of the mentioned methods, for example, by means of gamma sterilization.

The actual flow rate measurement is performed in a preferred embodiment of the method as a volume flow rate measurement, preferably ultrasound flow rate measurement (USD) or magnetic-inductive flow rate measurement (MID).

Ultrasound flow rate meters (USD) measure the speed of the flowing medium with the aid of acoustic waves and consist of two parts: the actual measurement transducer (ultrasound sensor) and an analysis and power part (transmitter or measurement transformer). It offers several advantages over other measurement methods as an acoustic measurement method. The measurement is substantially independent of the properties of the media used, such as electrical conductivity, density, temperature, and viscosity. The absence of moving mechanical parts reduces the maintenance effort and a pressure loss due to cross-sectional constriction does not occur. A large measurement range is among the further positive properties of this method.

A further contactless measurement principle is magnetic-inductive flow rate measurement (MID). The measurement principle of this flow rate meter uses the separation of moving charges in a magnetic field. The liquid to be measured, which must have a minimum conductivity, flows through the pipe or the hose. A magnetic field oriented perpendicularly to the flow direction is externally applied by means of coils. The charge carriers present in the conductive liquid, ions or charged particles, are deflected by the magnetic field. A voltage, which is detected using the analysis unit, arises at the measurement electrodes arranged perpendicularly to the magnetic field due to the charge separation. The level of the measured voltage is proportional to the flow speed of the charge carriers, i.e., to the flowing speed thereof.

Exemplary embodiments of the present invention are described in detail hereafter on the basis of the figures. The exemplary embodiments are not to be understood as restrictive, but rather are used to illustrate the present invention. Further embodiments are conceivable in the scope of the claims.

DETAILED DESCRIPTION

Figure 1:
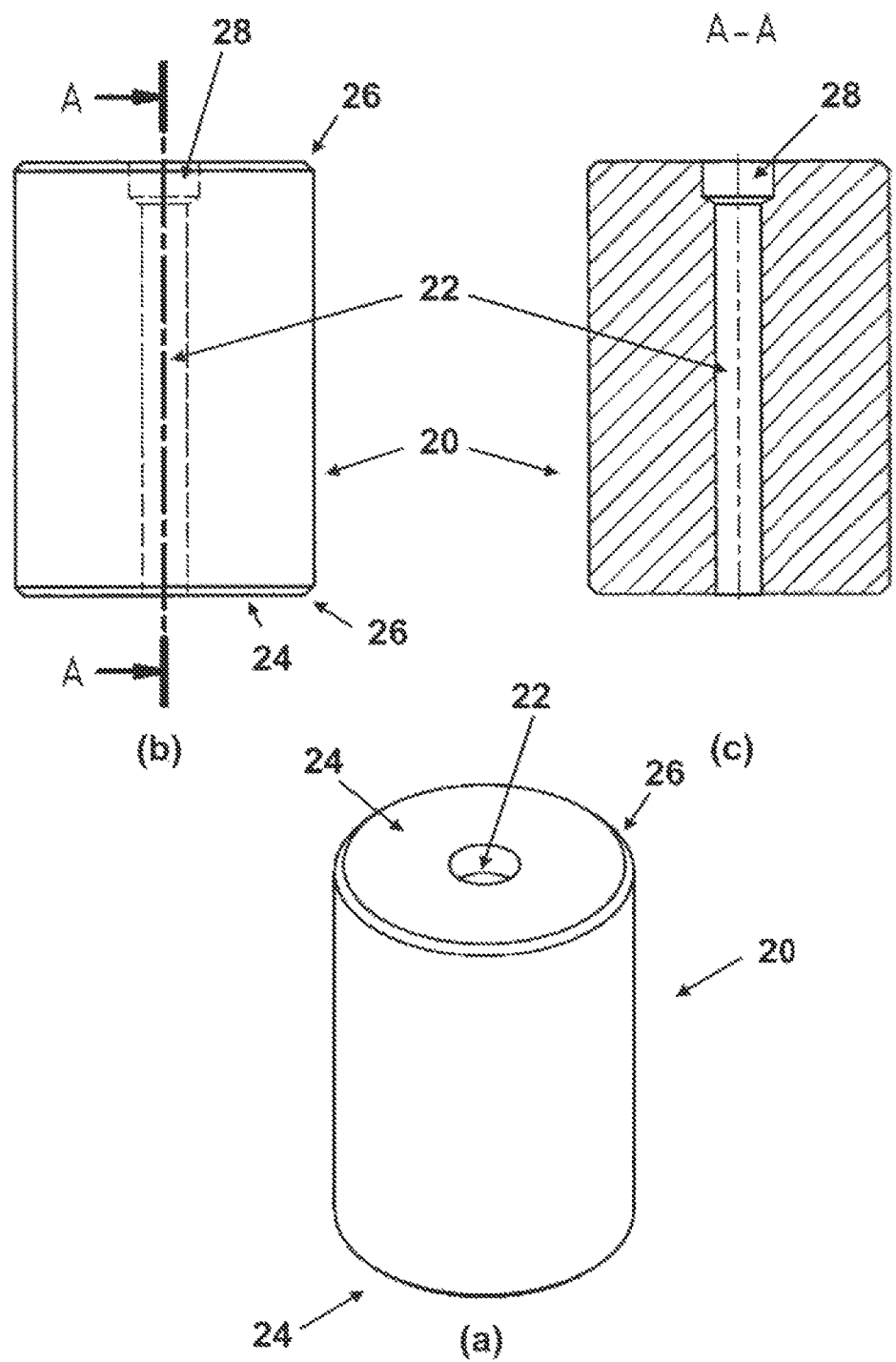
FIG. 1 shows an exemplary embodiment of the preform.

FIG. 1(a) shows an exemplary embodiment of a preform 20, as can be used in the method according to one embodiment of the invention, in a perspective view. The preform 20 has an essentially cylindrical shape, and can be produced from a thermoplastic plastic, for example, PE-HWST. The preform 20 has an essentially cylindrical borehole 22, which extends centrally through the preform 20 in the longitudinal direction of the preform 20. The end faces 24 are essentially planar and can have a chamfer 26.

FIG. 1(b) shows the preform 20 in a side view, and FIG. 1(c) shows the preform 20 in a sectional view, in section along line A-A in FIG. 1(b). On one of the end regions of the preform 20, the cylindrical borehole 22 has a widened region having a larger diameter, which can be referred to as a reservoir 28. The reservoir 28 can receive excess molten material, which is displaced by the channel implementation element along the borehole 22, when the channel implementation element is moved into the borehole 22 from the opposite side of the preform 20. The section of the preform 20 in which the reservoir 28 is implemented can be cut off after the implementation of the channel.

Figure 2:
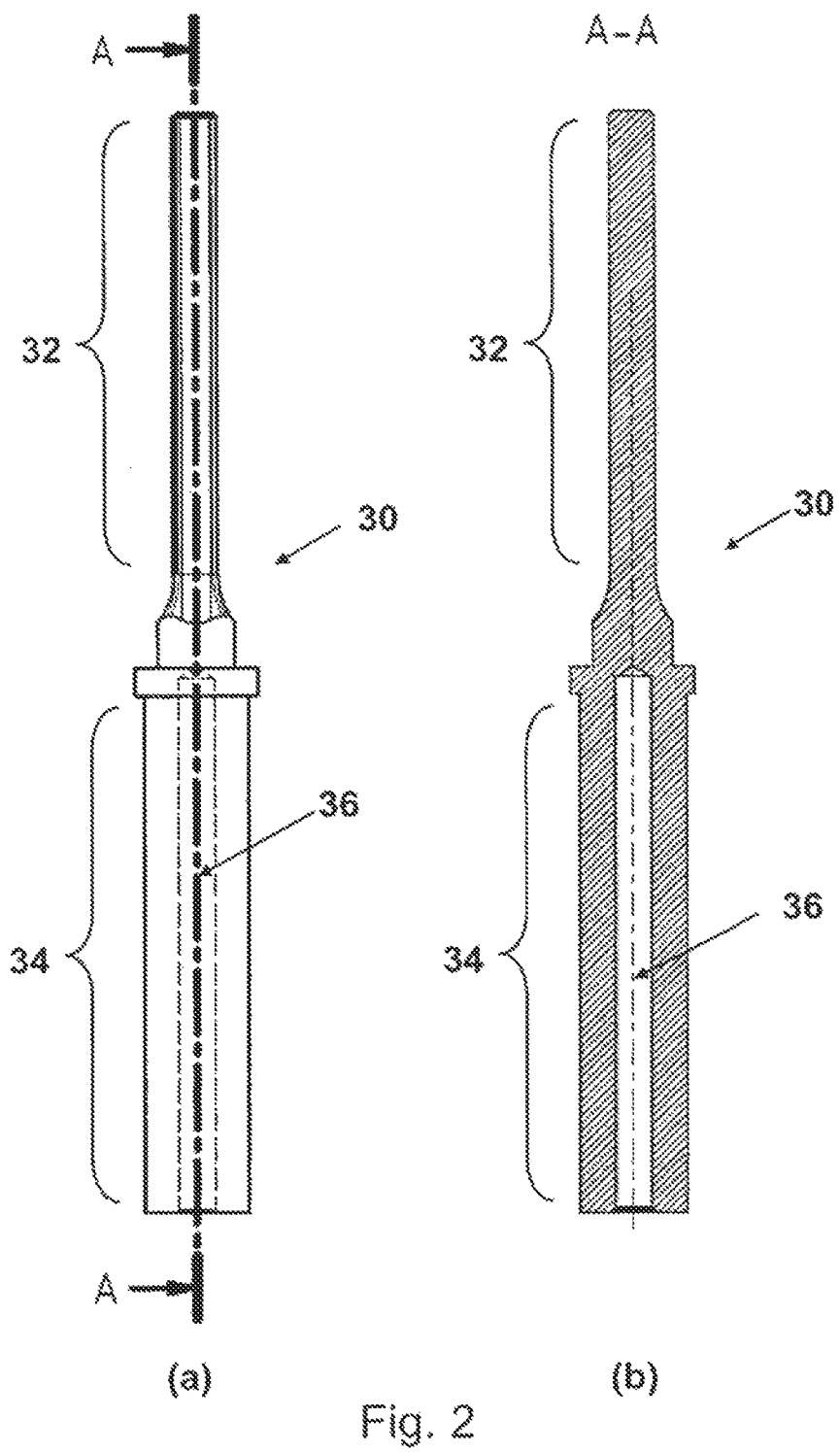
FIG. 2 shows a first exemplary embodiment of the channel implementation element.

FIG. 2(a) shows a first exemplary embodiment of the channel implementation element 30 in a side view. The channel implementation element 30 is implemented as a mandrel, in particular as a heating mandrel. The front region of the channel implementation element 30 according to the first exemplary embodiment, i.e., the insertion region 32, has a constant cross section over the length. The cross section is a rectangular, in particular square cross section, wherein the corners are chamfered. The rear region of the channel implementation element 30 has a cylindrically implemented chucking region 34.

FIG. 2(b) shows the channel implementation element 30 according to the first exemplary embodiment in a sectional view, in section along line A-A in FIG. 2(a). The chucking region 34 has a preferably cylindrical borehole or recess 36. A heating device and/or a cooling device for heating and/or cooling the channel implementation element 30 can be arranged in this recess 36. The heating and/or cooling device can include heating and/or cooling batteries or heating and/or cooling rods. Alternatively or additionally, heating and/or cooling the channel implementation element by means of a fluid which flows through and/or around the channel implementation element (for example, cooled and/or hot air) is also conceivable. Furthermore, the channel implementation element can be heated to a suitable temperature by means of an IR radiator and/or another, externally attachable heating element.

Figure 3:
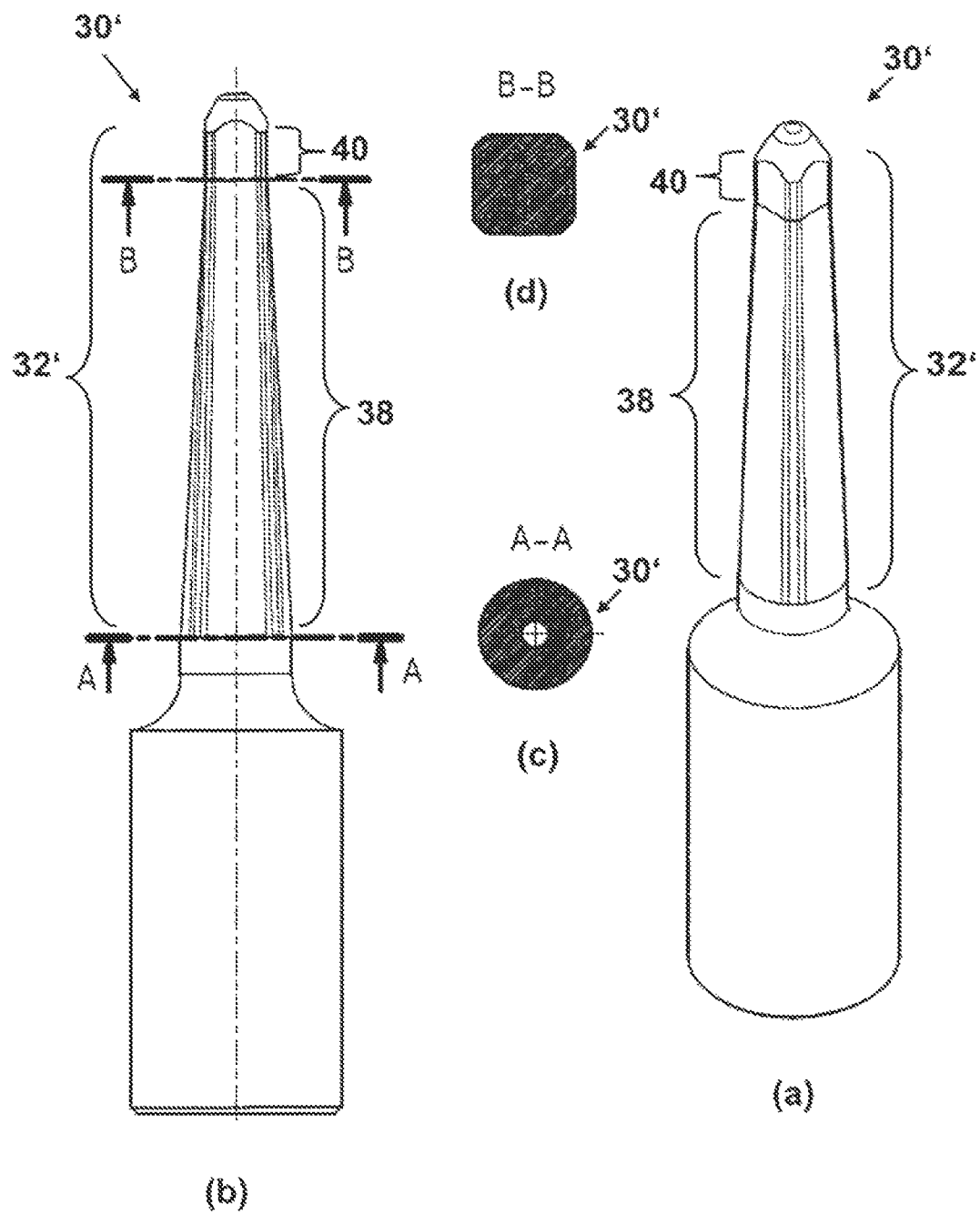
FIG. 3 shows a second exemplary embodiment of the channel implementation element.

FIG. 3(a) shows a second exemplary embodiment of the channel implementation element 30' in a perspective view, and FIG. 3(b) shows the second exemplary embodiment of the channel implementation element 30' in a side view. In contrast to the first exemplary embodiment, the front region of the channel implementation element 30', i.e., the insertion region 32, has a cross section variation region 38 and a cross section constant region 40.

FIG. 3(c) and FIG. 3(d) each show the channel implementation element 30' in a sectional view, once in section along line A-A in FIG. 3(b) and once in section along line B-B in FIG. 3(b). The cross section varies over the length of the cross section variation region 38 from the base toward the tip of the channel implementation element 30' from a round cross section (FIG. 3(c)) continuously to a square cross section (FIG. 3(d)). This square cross section can correspond to the square cross section having the chamfered corners of the channel implementation element according to the first exemplary embodiment. The variation of the cross section can extend uniformly over the length of the cross section variation region 38. In the end region of the channel implementation element 30', the cross section constant region 40, the channel implementation element 30' maintains the square cross section almost up to the tip. In other words, the cross section is constant in this region. A final tapering is then implemented toward the final tip of the channel implementation element 30'.

Figure 4:
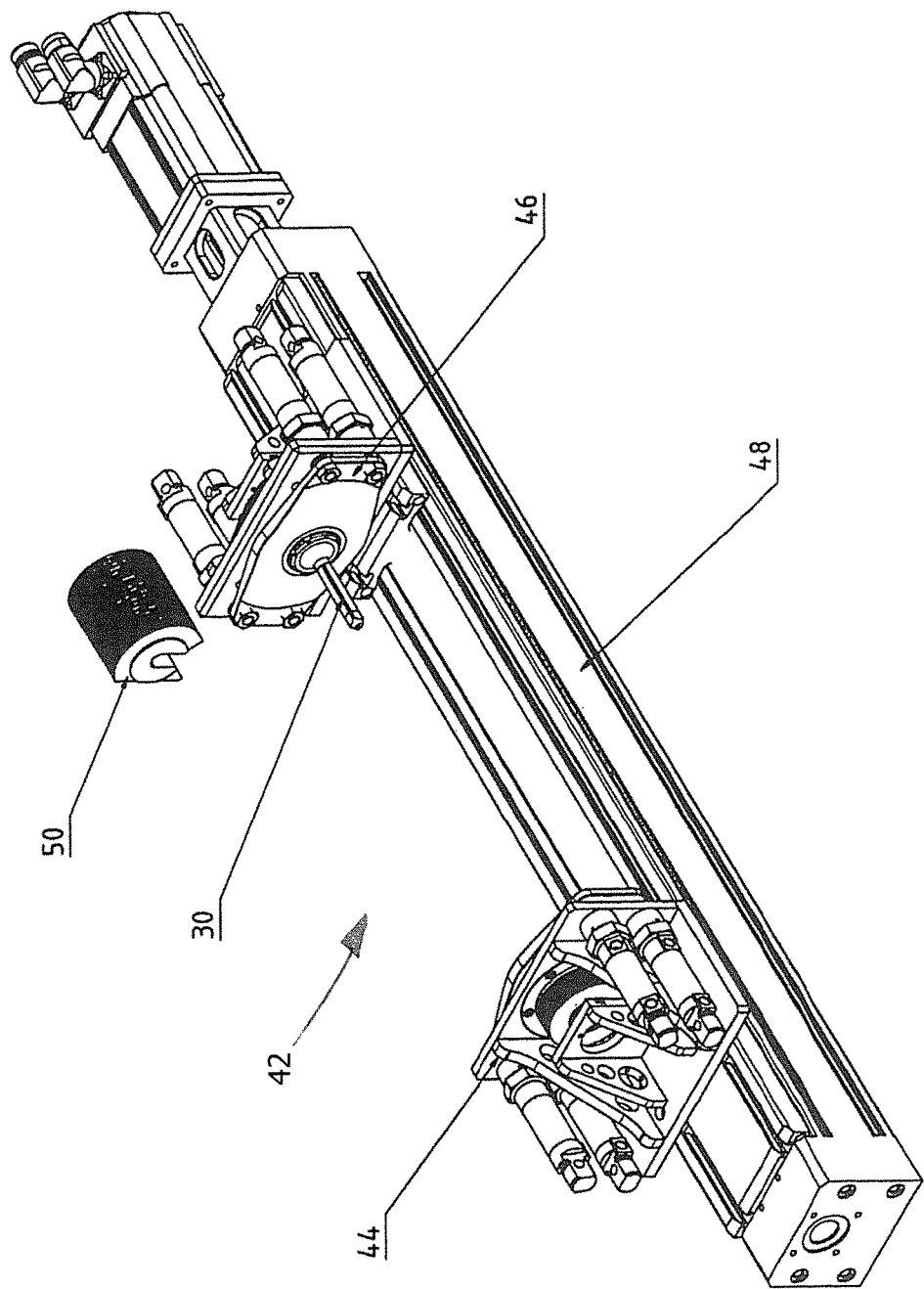
FIG. 4 shows an exemplary embodiment of the pressing device.

FIG. 4 shows an exemplary embodiment of the pressing device 42 in a perspective view. The pressing device 42 has a workpiece receptacle 44 and a chucking device 46. The preform is chucked in the workpiece receptacle 44, and the channel implementation element is chucked on its chucking region in the chucking device 46. In this case, the preform, in particular the recess of the preform, and the channel implementation element, in particular the insertion region of the channel implementation element, are aligned coaxially with one another or in relation to one another. Workpiece receptacle 44 and chucking device 46 are each arranged on carriages on shared rails 48, and can be moved linearly toward one another. The pressing device has a cupola 50, which can be lowered, and which can at least partially enclose the channel implementation element. In the retracted position of the chucking device 46, i.e., when the channel implementation element protrudes freely into the space, the cupola 50 can prevent heat loss of the heated channel implementation element. Alternatively or additionally, the cupola 50 can contain a heating device.

FIG. 5(a), FIG. 5(b) and FIG. 5(c) show the procedure in which the channel implementation element 30' is pressed into the preform 20. The channel implementation element 30' shown corresponds to the channel implementation element 30' according to the second exemplary embodiment. The recess 36' of the channel implementation element 30' according to the second exemplary embodiment extends deep into the mandrel-shaped region or insertion region 32', whereby better heating and/or cooling of the channel implementation element 30' by means of a heating and/or cooling device is enabled. Furthermore, temperature probes can be arranged along nearly the entire length of the channel implementation element 30', to thus detect the temperature distribution in the channel implementation element 30', in particular during the pressing into the preform 20.

The end position during the moving in or pressing in of the channel implementation element 30' is shown in FIG. 5(c). The material 52 of the preform 20 which is melted and displaced by the channel implementation element 30' is shown dark. This displaced material 52 is at least partially displaced into the reservoir 28, which is not indicated, however. The channel implementation element 30' is pressed far enough into the preform 20 that the tip thereof exits again on the other side of the preform 20. At least a part of the cross section constant region 40 remains in the interior of the preform 20.

Figure 5:
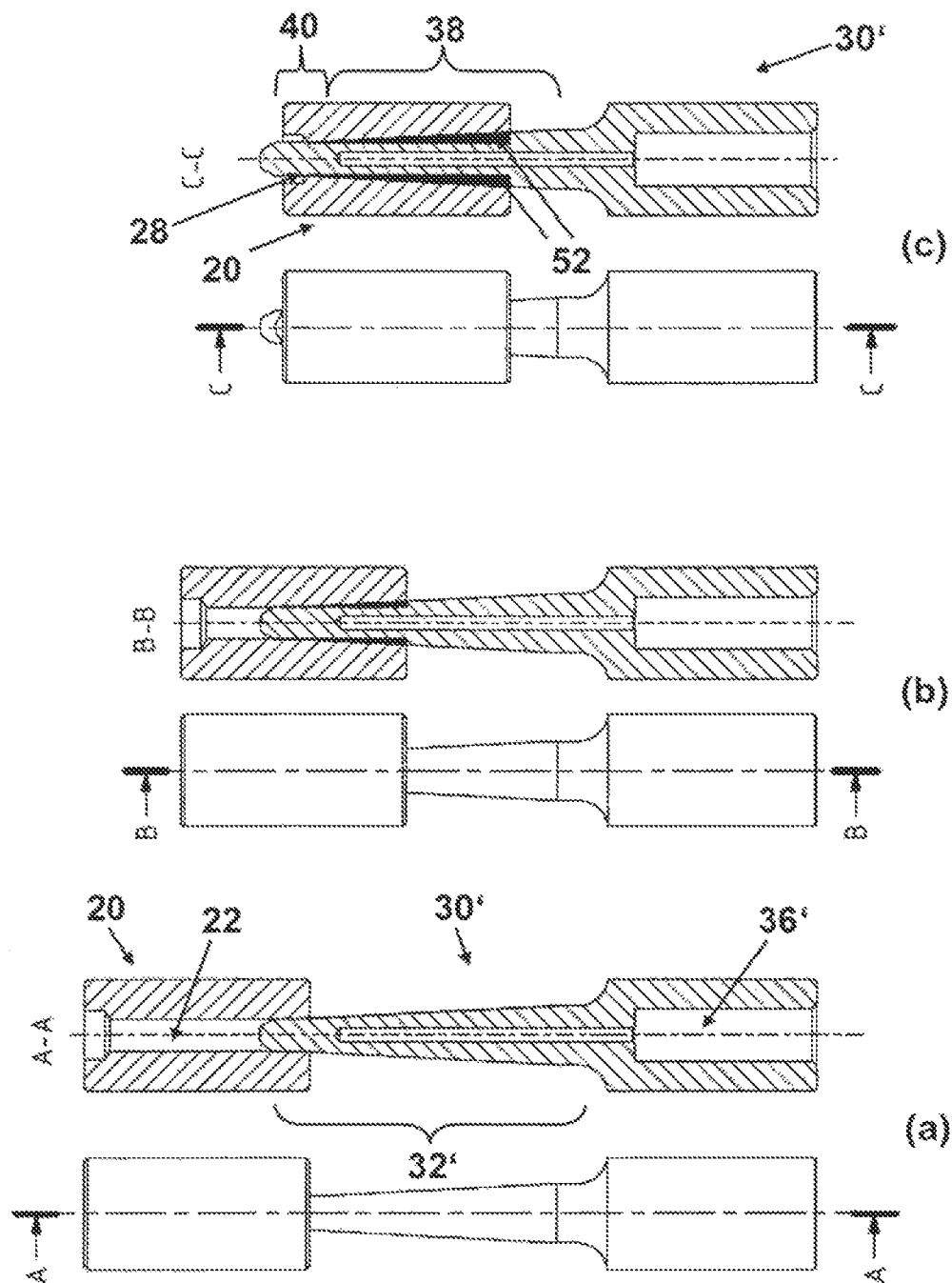
FIG. 5 shows the procedure in which the channel implementation element is pressed into the preform.

A method for implementing the channel will be described as an example hereafter on the basis of FIGS. 4 and 5.

A cylindrical molded plastic part made of HDPE having a centrally arranged cylindrical borehole 22 in the longitudinal direction of 10.6 mm diameter is used as the preform 20. The end faces 24 are planar and have a chamfer 26. Before the forming of the actual channel, the channel implementation element 30 and surrounding components of the pressing device 42 are preheated for approximately 30 minutes, so that the channel implementation element is temperature controlled uniformly. The cupola 50 for covering the channel implementation element 30 is lowered during the warm-up phase of the entire device and subsequently during each warm-up phase before the forming of the channel over the channel implementation element 30, to heat it uniformly. After the warm-up phase, the actual process of the channel forming is started.

For this purpose, the preform 20 is inserted into the device for the tool receptacle 44 on one side of the pressing device 42 and fixed with the aid of a collet chuck. The cupola 50 above the channel implementation element 30 is lifted out of the manufacturing region. Both the channel implementation element 30 and also the preform 20 are arranged on two opposing carriages on the rail 48, which are now moved toward one another. The insertion region 32 of the channel implementation element 30 plunges in this case at a speed of approximately 8 mm/s into the preform 20. As soon as the channel implementation element 30 has reached its end position inside the preform 20, the heater for heating the channel implementation element 30 is deactivated and the channel implementation element 30 is held for 50 seconds in the position. Subsequently, the channel implementation element 30 is withdrawn from the preform 20 at a speed of approximately 5 mm/s. The carriage now moves back into its starting position. While the channel implementation element is preheated for the formation of the next component over the duration of 85 seconds, the collet chuck for receiving the preform 20 is released and the finished component is removed, so that the next preform 20 can be inserted. The heating time of the channel implementation element 30 between the manufacturing of two finished preforms 20 having channel can be between 2 and 2.5 minutes, preferably 2 minutes, 15 seconds. The implemented channel can have a length of between 30 and 50 mm, for example, preferably 41 mm.

The preforms 20 are subsequently mechanically machined depending on the intended use to form the external contour and the overall length.

The surface roughness of the formed internal channel was measured using a perthometer from Zeiss according to DIN EN ISO 4287, and a value of Ra≤0.139 μm was measured. However, surface roughnesses of Ra≤0.139 μm are also achievable. For the measurement, the preform 20 was cut open along the implemented channel.

The channel formations for the hose connectors 7, 8, which flank the component for flow rate measurement, are manufactured according to the same method. While the channel of the middle part remains uniform over the entire length, a transition from round to polygonal takes place in the hose connectors. These contours are implemented by a channel implementation element 30 having a cross section tapering toward the tip.

FIG. 6(a) shows the welded state of two preforms 20A, 20B having a continuous channel in a side view. The welded region is not visible in FIG. 6(a), because of the external flange of the preform 20A, which is used as a vision protection.

FIG. 6(b) shows the welded state of the two preforms 20A, 20B having the continuous channel 56 in a sectional view, in section along line A-A in FIG. 6(a). The preform 20A corresponds to a preform, the channel section of which was implemented by the channel implementation element according to the second exemplary embodiment. Therefore, the channel 56 has a cross section in the region of the preform 20A, which is initially round and varies in the direction toward the preform 20B continuously to form a square cross section having chamfered corners. The preform 20B corresponds to a preform, the channel section of which was implemented by the channel implementation element according to the first exemplary embodiment. Therefore, the channel 56 in the region of the preform 20B has a constant, square cross section having chamfered corners. The product to be implemented from the welded preforms is shown dark. This product can be turned or milled from the preforms, for example. In this case, the part of the product of the preform 20A corresponds to the attachment region of the through-flow part and the part of the product of the preform 20B corresponds to the centrally arranged region of the through-flow part.

The preform 20A has at least one flange on its end facing toward the preform 20B, wherein the flange has a (preferably external) vision protection flange 54, a (preferably interposed) welding flange 58, and a (preferably internal) stop flange 60. The flange of the preform 20A is configured to cooperate with a corresponding flange of the preform 20B. The preform 20B has a (preferably identically implemented) flange on each of its two ends, wherein the flange has a stepped region 62, a (preferably interposed) welding flange 58, and a (preferably internal) stop flange 60. The stepped region 62 has a smaller diameter than the internal diameter of the external vision protection flange 54, and is therefore concealed by the vision protection flange 54 during welding of the two preforms. The welding flanges 58, 58 provide the material to be welded, and the internal stop flanges 60, 60 are used as the stop and/or sealing flange of the channel sections of the preforms 20A and 20B. it is therefore ensured in particular that possible welding material from the respective welding flanges 58 cannot enter the channel 56 in a transition region between the preforms 20, 20', so that preferably a smooth channel internal surface can be provided.

Figure 6:
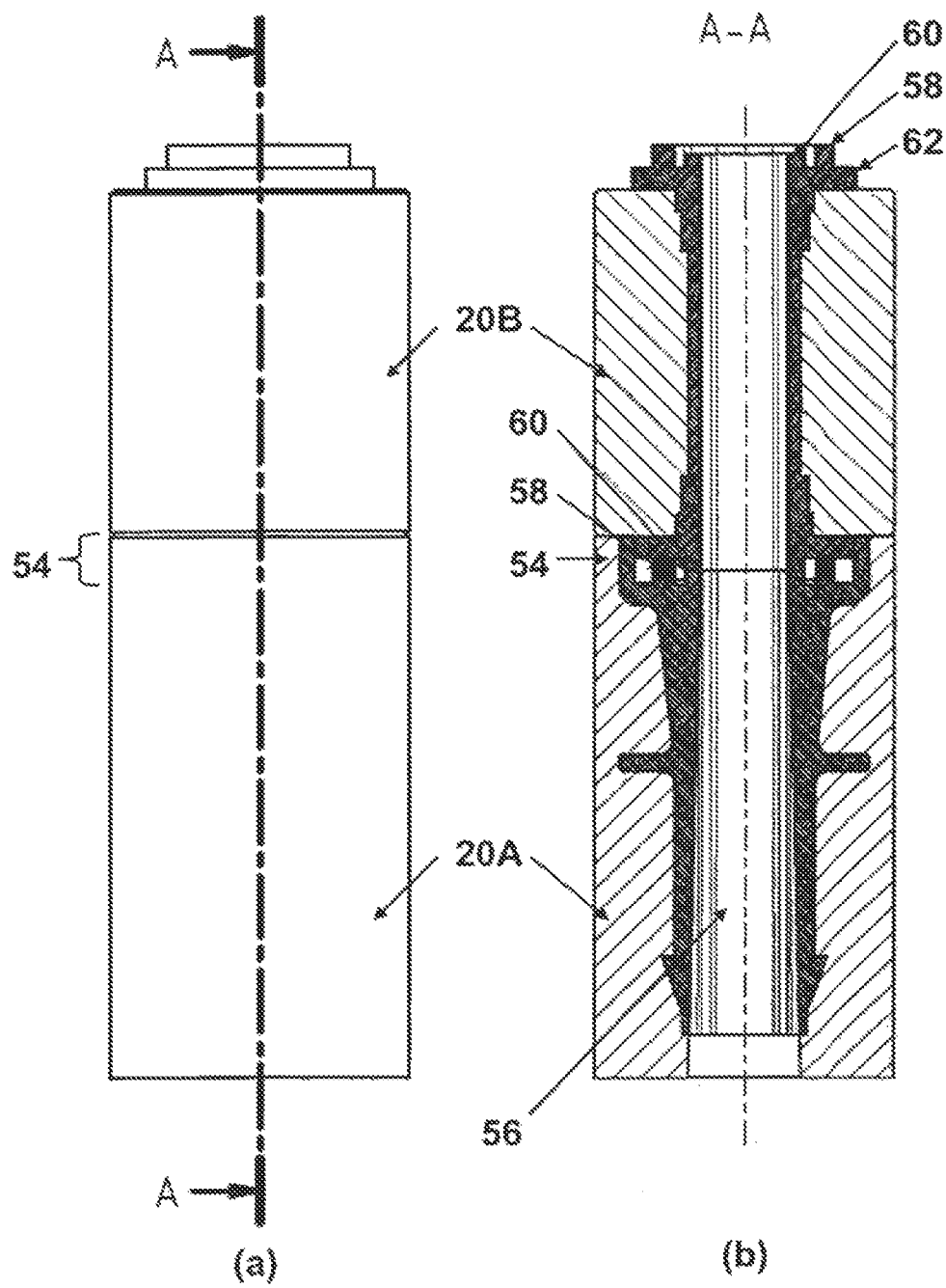
FIG. 6 shows the welded state of two preforms having a continuous channel.

A method for welding the preforms will be described as an example hereafter on the basis of FIGS. 4 and 6.

The above-described three preforms 20A, 20B, and 20C, i.e., a deformable region 2 as the middle part and two attachment regions 7, 8 in the form of hose connectors having defined internal channels, can be joined together by means of the same device 42, which is shown in FIG. 4. The channel implementation element 30 is removed from the device 42 and both carriages are equipped with collet chucks to receive the individual components to be connected. A vertically movable heating mirror is arranged in between. The heating mirror is heated over 60 minutes and reaches a temperature of 325° on the temperature regulator.

The frontally mechanically machined preforms are inserted and fixed in a previously established sequence in the corresponding collet chucks. In this case, via pins on the collet chucks (guide mandrels), which each fit in one groove in the component, it is ensured that the internal channels of the components are aligned exactly in relation to one another. Twisting of the collet chucks together with the components is therefore impossible. After the start, the heating mirror travels down and the two carriages travel with the frontal welding dams, i.e., the welding flanges 58, on the component on both sides toward the heating mirror. The welding dams are initially melted there for 30 seconds. After the initial melting time, the two carriages move away from one another and the heating mirror is then lifted out of the travel path. Subsequently, the carriages move far enough together that the preforms press against one another at their contact surfaces. The welding dams, which are pushed together and fuse in this case, cool down over a period of time of 15 seconds. After this cooling time, one collet chuck opens and the carriages move away from one another. After reaching the end position, the assembly made of deformable middle part 2 (preform 20B) and hose connector attachment region 7 (preform 20A or 20C) is released.

This assembly is now to be inserted inverted in the other collet chuck, so that the free end face of the middle part 2 protrudes out of the collet chuck for the next joining process. After completed warm-up time, this joining process begins again as described. After the second joining step with the remaining preform, an assembly is obtained made of a middle part preform and two hose connector preforms, which finally receive their final shape in mechanical machining.

Figure 7:
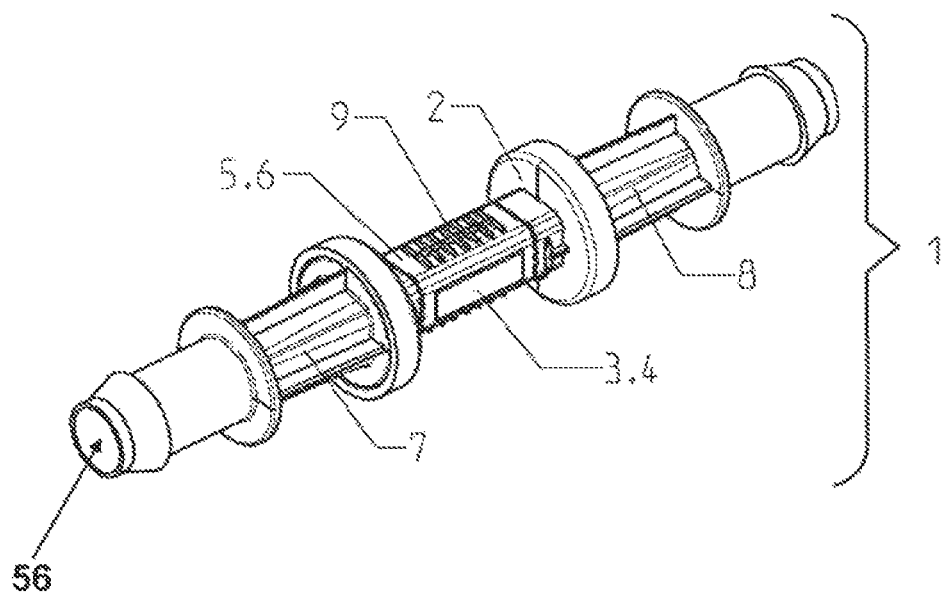
FIG. 7 shows an exemplary embodiment of the product.

FIG. 7 is a perspective overall illustration of the through-flow plastic part 1, an exemplary embodiment of the product, from the outside. The centrally arranged, deformable region 2 is flanked by the attachment regions 7 and 8, onto the outer ends of which hoses can be pushed. In the region of the attachment regions 7, 8, the round internal cross section of the attachment regions 7, 8 can be recognized. One of the pressure region surfaces 5, 6 having a corresponding profile 1 can be seen on the centrally arranged region 2. The pressure region surfaces 5, 6 are opposite to one another. One of the two flat sensor contact surfaces 3, 4, which are also opposite to one another, is located at a right angle thereto.

Figure 8:
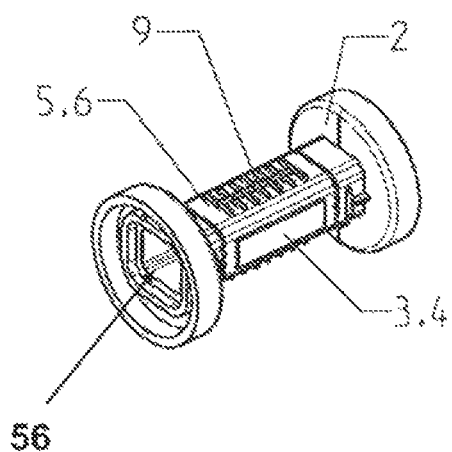
FIG. 8 shows the centrally arranged region of the exemplary embodiment of the product in a perspective view.

FIG. 8 is a perspective illustration of the centrally arranged region 2 having one of the pressure region surfaces 5, 6 and the profile 9 and also the sensor contact surfaces 3, 4. In this illustration, the nearly square internal cross section of the channel 56 can be recognized at the head end of the centrally arranged region 2.

Figure 9:
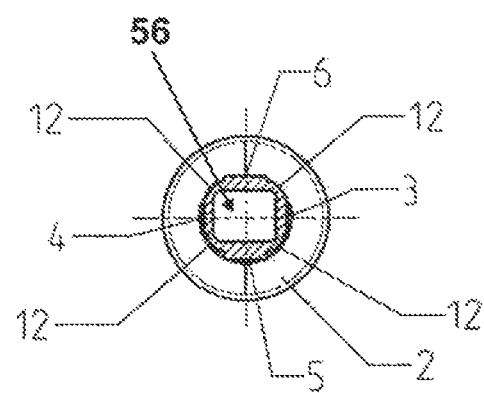
FIG. 9 shows the centrally arranged region of the exemplary embodiment of the product in a sectional view.

FIG. 9 shows a cross section through the centrally arranged region 2 having the thin points 12 between the pressure region surfaces 5, 6 and the sensor contact surfaces 3, 4. The measurement chamber resulting due to the perpendicular arrangement of the pressure region surfaces in relation to the sensor contact surfaces is thus formed as essentially rectangular.

Figure 10:
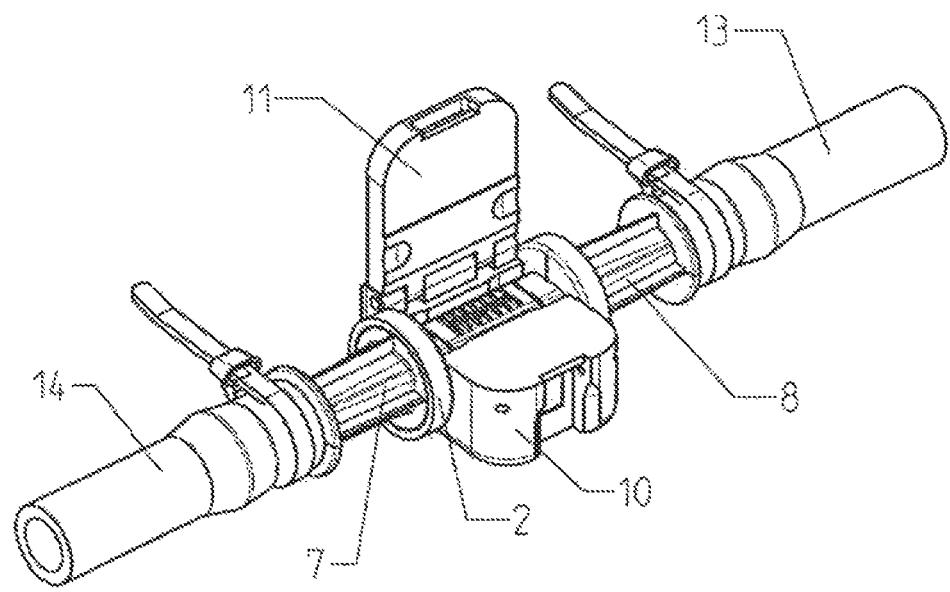
FIG. 10 shows the exemplary embodiment of the product including attached hoses and measurement transducers.

FIG. 10 is a perspective illustration of the through-flow plastic part 1 together with attached hoses and measurement transducers 10. The hoses 13, 14 are pushed onto the attachment regions 7, 8 and each fixed using a hose clamp. Furthermore, the centrally arranged region 2 of the through-flow plastic part 1 having the laterally arranged sensor contact surfaces 3, 4 is laid in a measurement transducer 10. Correspondingly, the pressure region surfaces 5, 6 on the top (visible) and bottom (not visible) are located in the measurement transducer 10. The cover 11 can thus be closed over one of the pressure region surfaces 5, 6.

Figure 11:
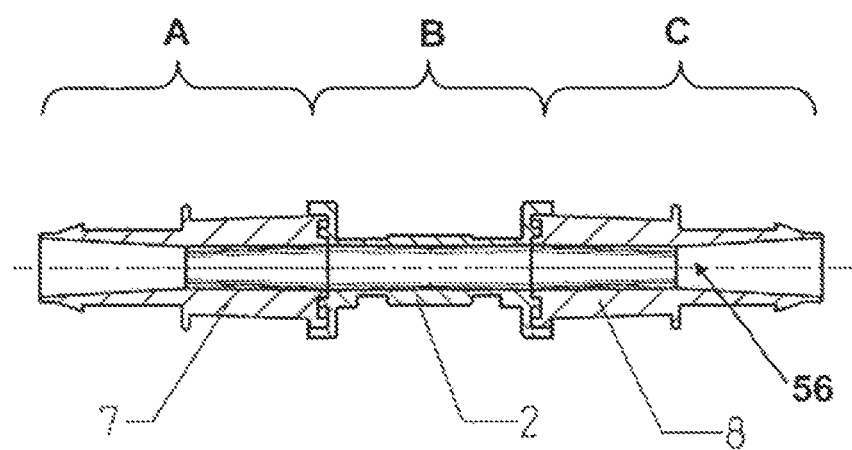
FIG. 11 shows the exemplary embodiment of the product in a sectional view.

FIG. 11 shows a longitudinal section through the entire through-flow plastic part 1 in a three-part construction having the centrally arranged region 2 and the attachment regions 7, 8. The inflow route of the fluid medium can be recognized through the section. The flow profile in the channel 56 is thus successively converted from a round into a polygonal flow profile, whereby turbulence can be prevented. The high surface quality and the seamless transition of the channel sections additionally ensures flow behavior without turbulence. The sections of the product are indicated by A, B, and C, which each were produced from a single preform.

Figure 12:
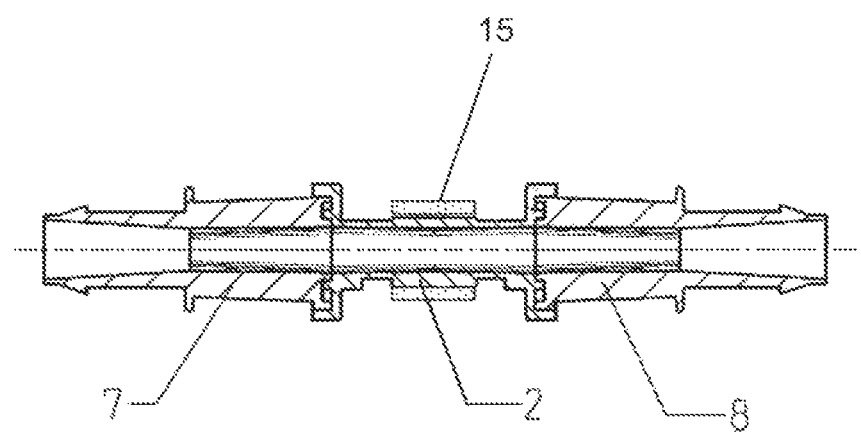
FIG. 12 shows a further exemplary embodiment of the product in a sectional view.

FIG. 12 shows a longitudinal section through a further embodiment of the through-flow plastic part 1 in three-part construction having the centrally arranged region 2 and the attachment regions 7, 8. In this embodiment, the centrally arranged region 2 additionally has an elastic or partially elastic contacting aid 15. The elastic or partially elastic contacting aid 15 preferably sheaths the centrally arranged region 2 at least in the region of the sensor contact surfaces 3, 4 and the pressure region surfaces 5, 6. However, the contacting aid can also be arranged only on the sensor contact surfaces 3, 4 and/or the pressure region surfaces 5, 6. The elastic or partially elastic contacting aid 15 at least partially consists of a material which is more yielding or softer than the material of the centrally arranged region 2. Furthermore, the material of the elastic or partially elastic contacting aid 15 is capable of transmitting sound waves of the measurement transducer or coupling them via the pressure region surfaces 5, 6 into the fluid material. Silicone is preferably used as the material for the contacting aid 15. The elastic or partially elastic contacting aid 15 can (preferably permanently) be connected or formed by means of extrusion coating, gluing, or welding with the centrally arranged region 2. The object of the elastic or partially elastic contacting aid 15 is in particular to compensate for production tolerances of the measurement transducer and/or ensure that the sound waves can be coupled reliably and uniformly via the pressure region surfaces 5, 6 into the fluid medium, and can be reliably detected via the sensor contact surfaces 3, 4. Therefore, preferably an elastic or partially elastic contacting aid, for example, in the form of a silicone layer or a silicone sheath, is provided around the centrally arranged region (preferably fixedly connected or formed with the through-flow plastic part, in particular on the sensor contact surface(s)). In this case, the contacting aid can be arranged entirely or sectionally, for example, only in the region of the sensor contact surfaces, around the centrally arranged region. In addition, additional means (for example, a contact gel) for establishing contact between sensor contact surfaces and the actual sensors can be substantially omitted.

The preforms and the product produced therefrom are preferably implemented from a plastic. To implement the channel in the preforms or in the product, the channel implementation element has a temperature during the implementation of the channel which is higher than the melting temperature of the plastic and is lower than the decomposition temperature of the plastic.

LIST OF REFERENCE NUMERALS 1 through-flow plastic part
2 deformable region
3, 4 sensor contact surfaces
5, 6 pressure region surfaces
7, 8 attachment regions
9 profile
10 measurement transducer
11 cover
12 thin points
13, 14 hoses
15 contacting aid
20, 20a, 20b preform
22 recess
24 end face
26 chamfer
28 reservoir
30, 30' channel implementation element
32, 32' insertion region
34 chucking region
36, 36' recess
38 cross section variation region
40 cross section constant region
42 pressing device
44 workpiece receptacle
46 chucking device
48 rail
50 cupola
52 displaced material
54 vision protection flange
56 channel
58 welding flange
60 stop flange
62 stepped region

The invention claimed is:

1. A method for implementing a channel (56), comprising:
providing a pressing device (42) comprising a chucking device (46) having a channel implementation element (30; 30') and having a workpiece receptacle (44) opposed to the chucking device (46) on a carriage (48);
providing a preform (20) having opposite first and second ends and an external surface of a specified external shape extending between the first and second ends, the preform (20) further having a recess (22) extending at least into the first end;
mounting the preform (20) on the workpiece receptacle (44) of the pressing device (42) and opposed to the channel implementation element (30; 30');
heating the channel implementation element (30; 30') to a temperature greater than a melting temperature of a material of the preform (20), wherein an external contour of the channel implementation element (30; 30') at least regionally corresponds to an internal contour of the channel (56) to be implemented; and
moving the heated channel implementation element (30; 30') and/or the preform (20) in relation to one another along the pressing device (42) so that the heated channel implementation element (30; 30') moves at least regionally into the recess (22) in a moving-in direction, and so that the heated channel implementation element (30; 30') at least partially melts and displaces the material of the preform (20) in a region adjoining the recess (22) while the external surface of the preform (20) remains in a solid state and maintains the specified external shape from the first end to the second end, thereby implementing at least a part of the channel (56) to be implemented.

2. The method of claim 1, wherein the channel implementation element (30; 30'), after cooling and at least partial solidification of the molten material of the preform (20), is moved out of the preform (20).

3. The method of claim 1, wherein the channel implementation element (30; 30') at least regionally has a varying cross section along an implementation direction of the channel (56).

4. The method of claim 1, wherein
the recess (22) is at least partially an essentially cylindrical recess (22), which has an axial length greater than a diameter of the recess;
the channel implementation element (30; 30') has the form of a mandrel; and
the moving-in direction of the channel implementation element (30; 30') into the recess (22) corresponds to an axial direction of the recess (22).

5. The method of claim 1, further comprising:
providing a plurality of preforms (20A, 20B);
implementing a part of the channel in each of the preforms (20A, 20B) by means of the channel implementation element (30; 30'); and connecting the preforms (20A, 20B) to one another such that a continuous channel (56) is implemented.

6. The method of claim 5, wherein the preforms (20A, 20B) are connected by welding, comprising implementing at least one welding flange (58) on surfaces of the preforms (20A, 20B) to be welded.

7. The method of claim 6, wherein the preforms (20A, 20B) comprise:
- a stop flange (60), which is used as a stop and/or sealing flange of the parts of the channels of the preforms (20A, 20B); wherein the stop flange (60) is arranged radially inside the welding flange (58); and/or
- a vision protection flange (54), which is used as a vision protector and is arranged radially outside the welding flange (58).

8. The method of claim 5, wherein the connecting of the preforms (20A, 20B) comprises:
- aligning and guiding the preforms (20A, 20B) to be connected by inserting a guide mandrel having an external contour, which at least regionally corresponds to the internal contour of the parts of the channel of the preforms (20A, 20B) to be welded, wherein the guide mandrel is inserted through the part of the channel of one preform (20A) at least partially into the part of the channel of the other preform (20B).

9. A method for implementing a channel (56), comprising:
- providing first, second and third preforms (20, 20A, 20B), each of the preforms (20, 20A, 20B) having a recess (22) in one end;
- providing first and second channel implementation elements (30', 30) in the form of mandrels, each of the channel implementation elements (30', 30) having a tip;
- heating the channel implementation elements (30'; 30) to a temperature greater than a melting temperature of a material of the first, second and third preforms (20, 20A, 20B), wherein an external contour of the channel implementation elements (30; 30') at least regionally corresponds to an internal contour of the channel (56) to be implemented;
- moving the heated first channel implementation element (30') and/or the first preform (20) in relation to one another so that the heated first channel implementation element (30') moves at least regionally into the recess (22) of the first preform (20) in a moving-in direction, and so that the heated first channel implementation element (30') at least partially melts and displaces the material of the first preform (20) in a region adjoining the recess (22) while an external surface of the first preform (20) remains in a solid state, thereby implementing a first part of the channel (56) to be implemented in the first preform (20) by means of the first channel implementation element (30'), wherein an insertion section (32') of the first channel implementation element (30') at least regionally has a continuously varying cross section toward the tip of the first channel implementation element (30'), and wherein the cross section varies toward the tip from an essentially round to an essentially rectangular cross section;
- moving the heated second channel implementation element (30) and/or the second preform (20B) in relation to one another so that the heated second channel implementation element (30) moves at least regionally into the recess (22) of the second preform (20B) in a moving-in direction, and so that the heated second channel implementation element (30) at least partially melts and displaces the material of the second preform (20B) in a region adjoining the recess (22) of the second preform (20B) while an external surface of the second preform (20B) remains in a solid state, thereby implementing a second part of the channel (56) to be implemented in the second preform (20B) by means of the second channel implementation element (30), wherein an insertion section (32) of the second channel implementation element (30) has an essentially rectangular cross section, which corresponds to the rectangular cross section in the region of the tip of the first channel implementation element (30');
- implementing a third part of the channel (56) to be implemented in a third of the preforms (20A) by means of the first channel implementation element (30'); and
- after the implementation of the parts of the channel (56), connecting the first and third preforms (20, 20A) to the second preform (20B) such that a continuous channel (56) is implemented, wherein the cross section of the channel (56) initially varies from an essentially round cross section continuously to an essentially rectangular cross section, and continuously varies toward the end of the channel (56) from the essentially rectangular cross section to the essentially round cross section.

* * * * *